United States Patent
Shimodaira et al.

(10) Patent No.: US 10,112,297 B2
(45) Date of Patent: Oct. 30, 2018

(54) ROBOT CONTROL APPARATUS, ROBOT, AND ROBOT SYSTEM

(71) Applicant: Seiko Epson Corporation, Tokyo (JP)

(72) Inventors: Yasuhiro Shimodaira, Matsumoto (JP); Masaki Motoyoshi, Azumino (JP); Kaoru Takeuchi, Azumino (JP); Katsuji Igarashi, Chino (JP)

(73) Assignee: Seiko Epson Corporation (JP)

( * ) Notice: Subject to any disclaimer, the term of this patent is extended or adjusted under 35 U.S.C. 154(b) by 49 days.

(21) Appl. No.: 15/171,326

(22) Filed: Jun. 2, 2016

(65) Prior Publication Data

US 2016/0354925 A1  Dec. 8, 2016

(30) Foreign Application Priority Data

Jun. 3, 2015   (JP) ................... 2015-112890
Jul. 29, 2015  (JP) ................... 2015-149344
Jul. 30, 2015  (JP) ................... 2015-150428

(51) Int. Cl.
*B25J 9/16*      (2006.01)
*B25J 13/08*     (2006.01)

(52) U.S. Cl.
CPC .......... *B25J 9/1633* (2013.01); *B25J 9/1664* (2013.01); *B25J 13/085* (2013.01); *G05B 2219/39322* (2013.01); *G05B 2219/39348* (2013.01); *G05B 2219/39529* (2013.01)

(58) Field of Classification Search
CPC ...... B25J 9/1633; B25J 9/1664; B25J 13/085; G05B 19/235; G05B 19/237; G05B 2219/39318–2219/39333; G05B 2219/39338–2219/39348; G05B 2219/39529; G05B 2219/39364

See application file for complete search history.

(56) References Cited

U.S. PATENT DOCUMENTS

| | | | |
|---|---|---|---|
| 7,340,323 B2 | 3/2008 | Zhang et al. | |
| 2014/0188281 A1 | 7/2014 | Nagai et al. | |
| 2014/0330432 A1* | 11/2014 | Simaan ................. | B25J 9/1625 700/250 |

FOREIGN PATENT DOCUMENTS

| | | |
|---|---|---|
| JP | 2007-196298 A | 8/2007 |
| JP | 2013-202731 A | 10/2013 |
| JP | 2014-128857 A | 7/2014 |

OTHER PUBLICATIONS

Tafazoli et al., "Impedance Control of a Teleoperated Excavator", May 2002, IEEE Transactions on Control Systems Technology, vol. 10, No. 3, pp. 355-367 (Year: 2002).*

(Continued)

*Primary Examiner* — Spencer D Patton
(74) *Attorney, Agent, or Firm* — Harness, Dickey & Pierce, P.L.C.

(57) ABSTRACT

A robot control apparatus that controls a robot including a manipulator, a force detector provided in the manipulator, and an actuator that drives the manipulator based on a target position, includes a display control unit that displays a motion position of the manipulator derived based on a target force and an output of the force detector and the target position on a screen.

9 Claims, 20 Drawing Sheets

(56) References Cited

OTHER PUBLICATIONS

Vinoth et al., "Indirect disturbance compensation control of a planar parallel (2-PRP and 1-PPR) robotic manipulator", May 2014, Elsevier Robotics and Computer-Integrated Manufacturing 30, pp. 556-564 (Year: 2014).*

Ferreira et al., "Human-machine interface based on EMG and EEG applied to robotic systems", Mar. 2008, Journal of NeuroEngineering and Rehabilitation, (Year: 2008).*

* cited by examiner

| | FORCE CONTROL-ASSOCIATED COMMAND | POSITION CONTROL COMMAND |
|---|---|---|
| CP | Move, TMove, BMove, CVMove, Arc, Arc3, FCSMove | Move, TMove, BMove, CVMove, Arc, Arc3, FCSMove |
| PTP | | Pass, Pulse, Go, TGo, BGo, JTran, PTran |
| CP+PTP | | Jump, Jump3 |
| OTHERS | FCKeep | Jump3CP |

FORCE COORDINATE SYSTEM SETTINGS

| NUMBER | LABEL |
|---|---|
| 1 | HAND SURFACE 1 DISTAL END |
| 2 | HAND SURFACE 2 WORK SIDE SURFACE |
| 3 | |
| 4 | HAND SURFACE 3 DISTAL END |

FORCE COORDINATE 4 SETTING ITEMS

| RELATIVE POSITION FROM TCP | [mm] |
|---|---|
| x | 0 |
| y | 30 |
| z | 20 |
| RELATIVE ATTITUDE TO TCP | |
| MODE | TCP COINCIDENCE |

FIG.11A

FORCE CONTROL SETTINGS

| NUMBER | LABEL |
|---|---|
| 1 | TO CONTACT |
| 2 | PRESSING CONDITION |
| 3 | |
| 4 | ATTITUDE COPY |

| FORCE CONTROL 2 SETTING ITEMS | 4 |
|---|---|
| FORCE COORDINATE SYSTEM SELECTION | |
| EFFECTIVE | True, True, True, False, False |
| VIRTUAL SPRING | 0, 0, 0, 0, 0, 0 |
| VIRTUAL VISCOSITY | 3, 3, 3, 3, 3, 3 |
| VIRTUAL MASS | 1, 1, 1, 1, 1, 1 |

FIG. 11B

FORCE TRIGGER SETTINGS

FORCE TRIGGER 1 SETTING ITEMS

| FORCE COORDINATE SYSTEM SELECTION | 4 |
|---|---|
| IS OUTSIDE True ? | True, True, True, False, False |
| EFFECTIVE | True, True, True, False, False, False, True, True |
| TRANSLATIONAL DIRECTION UPPER LIMIT | 80, 80, 80 |
| TRANSLATIONAL DIRECTION LOWER LIMIT | -80, -80, -80 |
| ROTATION DIRECTION UPPER LIMIT | 2000, 2000, 2000 |
| ROTATION DIRECTION LOWER LIMIT | -2000, -2000, -2000 |
| FORCE / TORQUE | 80, 2000 |

| NUMBER | LABEL |
|---|---|
| 1 | CONTACT SENSING |
| 2 | FOR EMERGENCY STOP |
| 3 | |
| 4 | COPY START DETERMINATION |

FIG.11C

< PRACTICAL EXAMPLES >

Fset FC1.Fz_Enabled, True
Fset FC1.Fz_targetForce, 0
Fset FC1.Fz_Spring, 0
Fset FC1.Fz_Damper, 3
Fset FC1.Fz_Mass, 3

Move P1 FC1 CF

Fset FC1.Fz_TargetForce,-0.1 * RStdGravity

< PROCESSING DETAILS >

Fz DIRECTION = EFFECTIVE
PRESSING FORCE IN Fz DIRECTION = 0
Fz VIRTUAL SPRING = 0
Fz VIRTUAL VISCOSITY = 3
Fz VIRTUAL MASS = 3

MOVE TO CONTACT POSITION BY FORCE CONTROL

CHANGE PRESSING FORCE IN Fz DIRECTION TO -0.1 kgf

< COMPARATIVE EXAMPLES >

ForceControlSetting0,0,1,0,0,0,0,0,0,0,0,0,0,0,0,
0,3,3,1,1,3,3,1,1

ForceControl On
Move P1

ForceControlSetting0,0,1,0,0,0,0,0,-
0,1,0,0,0,0,0,0,0,0,3,3,1,1,3,3,3,1,1

FIG. 12

| CLASSIFICATION | | PARAMETER OF MOVEMENT STATE | | DISPLAYED IMAGE |
|---|---|---|---|---|
| | | TARGET | REAL | |
| TRANSLATIONAL MOVEMENT | MOVING STATE | TRANSLATIONAL DIRECTION | TRANSLATIONAL DIRECTION | ARROW |
| TRANSLATIONAL MOVEMENT | MOVING STATE | ACCUMULATED TRANSLATIONAL DISTANCE | ACCUMULATED TRANSLATIONAL DISTANCE | NUMERICAL VALUE (SCALAR) |
| TRANSLATIONAL MOVEMENT | MOVING STATE | TRANSLATIONAL VELOCITY | TRANSLATIONAL VELOCITY | NUMERICAL VALUE (SCALAR) |
| TRANSLATIONAL MOVEMENT | MOVING STATE | TRANSLATIONAL ACCELERATION | TRANSLATIONAL ACCELERATION | NUMERICAL VALUE (SCALAR) |
| ROTATIONAL MOVEMENT | MOVING STATE | ROTATION DIRECTION | ROTATION DIRECTION | ARROW |
| ROTATIONAL MOVEMENT | MOVING STATE | ACCUMULATED ROTATION ANGLE | ACCUMULATED ROTATION ANGLE | NUMERICAL VALUE (SCALAR) |
| ROTATIONAL MOVEMENT | MOVING STATE | ROTATION VELOCITY | ROTATION VELOCITY | NUMERICAL VALUE (SCALAR) |
| ROTATIONAL MOVEMENT | MOVING STATE | ANGULAR VELOCITY | ANGULAR VELOCITY | NUMERICAL VALUE (SCALAR) |
| ROTATIONAL MOVEMENT | MOVING STATE | ANGULAR ACCELERATION | ANGULAR ACCELERATION | NUMERICAL VALUE (SCALAR) |
| TRANSLATIONAL MOVEMENT | FORCE STATE | TRANSLATIONAL FORCE DIRECTION | TRANSLATIONAL FORCE DIRECTION | ARROW |
| TRANSLATIONAL MOVEMENT | FORCE STATE | MAGNITUDE OF TRANSLATIONAL FORCE | MAGNITUDE OF TRANSLATIONAL FORCE | NUMERICAL VALUE (SCALAR) |
| ROTATIONAL MOVEMENT | FORCE STATE | TORQUE DIRECTION | TORQUE DIRECTION | ARROW |
| ROTATIONAL MOVEMENT | FORCE STATE | MAGNITUDE OF TORQUE | MAGNITUDE OF TORQUE | NUMERICAL VALUE (SCALAR) |

FIG.16

ROBOT CONTROL APPARATUS, ROBOT, AND ROBOT SYSTEM

BACKGROUND

1. Technical Field

The present invention relates to a robot control apparatus, a robot, and a robot system.

2. Related Art

Recently, in the field of robots, a force detector is used for controlling a motion position in response to a force applied to a manipulator. Here, the motion position refers to a position derived based on a target force in active impedance control and a force actually applied to the manipulator. Patent Document 1 (JP-A-2014-128857) discloses a technology that facilitates teaching by displaying temporal changes of the force applied to the manipulator and displaying temporal changes of the motion position of the manipulator.

Further, in the field of robots, force control of controlling the manipulator in response to the force applied to the manipulator is used. For example, FIG. 2 of Patent Document 2 (U.S. Pat. No. 7,340,323) shows a program for switching between a force control mode of controlling the manipulator in response to the force applied to the manipulator and a position control mode of controlling the manipulator regardless of the force applied to the manipulator using "Activate ForceControl;" command and "Deactivate ForceControl;" command.

Furthermore, in the field of robots, a technology of displaying a motion state of the robot on a display or a teaching pendant is known (see Patent Document 3 (JP-A-2007-196298) and Patent Document 4 (JP-A-2013-202731)). In Patent Documents 3, 4, the display and the teaching pendant are visually recognized, and thereby, the motion state of the robot may be recognized.

However, in the technology disclosed in Patent Document 1, a correspondence relationship between a target trajectory set for the robot and an actual motion trajectory is hard to understand. For example, it is necessary for a teacher to perform teaching while updating an initial position and a target position by trial and error in consideration of an actual motion trajectory relative to the target trajectory set for the robot, however, when the correspondence relationship between the target trajectory and the actual motion trajectory is hard to understand, there is a problem that a long time is required for determination as to whether or not the teaching is optimal.

Further, in the technology disclosed in Patent Document 2, when a command for operating the manipulator in response to the applied force is executed after switching from the position control mode to the force control mode by a command, there is a problem that reproducibility of the motion result of the manipulator is lower. That is, in the case where the crystal piezoelectric effect is used or the like, the outputs depends on time depending on the force detector, and the motion result differs depending on the time of the output of the force detector at which the manipulator is controlled. Specifically, when the force applied to the manipulator is detected with reference to the output of the force detector at the time of switching from the position control mode to the force control mode, the motion result differs due to differences in time after switching to the force control mode to execution of the command of actually operating the manipulator.

Furthermore, in the technologies disclosed in Patent Documents 3, 4, even when the motion state is displayed on the display and the teaching pendant, there is a problem that it is hard to intuitively recognize the displayed part of the robot in the motion state. Visual recognition of the display and the teaching pendant is required to confirm the motion state, and there is a problem that a user must look away once from the robot actually in motion.

SUMMARY

An advantage of some aspects of the invention is to provide a technology of facilitating understanding of a correspondence relationship between a target trajectory and an actual motion trajectory, a technology of improving reproducibility of force control for a robot, or a technology of facilitating recognition of a state of a manipulator.

APPLICATION EXAMPLE 1

A robot control apparatus according to this application example is a robot control apparatus that controls a robot including a manipulator, a force detector provided in the manipulator, and an actuator that drives the manipulator based on a target position, and includes a display control unit that displays a motion trajectory of the manipulator derived based on a target force and an output of the force detector and a trajectory of the target position on a screen.

According to this configuration, a teacher may easily understand the target position and trajectory and the actual motion position and trajectory.

APPLICATION EXAMPLE 2

In the robot control apparatus according to Application Example 1, it is preferable that the display control unit displays the target position and the motion position on the same coordinate plane.

APPLICATION EXAMPLE 3

In the robot control apparatus according to Application Example 2, it is preferable that the display control unit displays a trajectory formed by projection of the target position in three dimensions and the motion position in three dimensions on a two-dimensional coordinate plane.

APPLICATION EXAMPLE 4

In the robot control apparatus according to the application example described above, it is preferable that the display control unit displays the target position and the motion position as time functions.

APPLICATION EXAMPLE 5

In the robot control apparatus according to the application example described above, it is preferable that the display control unit acquires a display section and displays the target position and the motion position corresponding to the display section.

APPLICATION EXAMPLE 6

In the robot control apparatus according to Application Example 5, it is preferable that the display section is specified by an identifier of a command for controlling the manipulator.

APPLICATION EXAMPLE 7

In the robot control apparatus according to Application Example 5 or 6, it is preferable that the display section is specified by time.

APPLICATION EXAMPLE 8

In the robot control apparatus according to the application example described above, it is preferable that the display control unit displays directions of change of the target position and the motion position.

APPLICATION EXAMPLE 9

In the robot control apparatus according to the application example described above, it is preferable that the display control unit displays the target position and the motion position in real time.

APPLICATION EXAMPLE 10

In the robot control apparatus according to the application example described above, it is preferable that a teaching unit that receives a teaching of a teacher based on the displayed target position and motion position is further provided.

APPLICATION EXAMPLE 11

A robot system according to this application example includes a robot including a manipulator, a force detector provided in the manipulator, and an actuator that drives the manipulator based on a target position, and the robot control apparatus according to the application example described above.

APPLICATION EXAMPLE 12

A robot control apparatus according to this application example is a robot control apparatus that controls a robot including a manipulator and a force detector that detects a force acting on the manipulator, wherein, when executing a command for operating the manipulator, a control unit that controls a motion of the manipulator switches between control of the motion of the manipulator based on an output of the force detector and control of the motion of the manipulator not based on the output of the force detector in response to a parameter of the command.

Here, "command for operating manipulator" refers to a command itself for operating the manipulator, but does not include a command for setting and switching between modes itself not for operating the manipulator. That is, for example, in the application example, whether or not the motion of the manipulator is controlled based on the output of the force detector is determined by an argument of the command and a main body itself of the command for operating the manipulator. Therefore, according to the application example, when the motion of the manipulator is controlled based on the output of the force detector, the motion of the manipulator may be controlled based on the output of the force detector with a time at which the command for actually operating the manipulator is executed as an output reference. Thus, according to the application example, reproducibility of force control for the robot may be improved.

APPLICATION EXAMPLE 13

In the robot control apparatus according to Application Example 12, it is preferable that the control unit resets the force detector when executing the command for controlling the motion of the manipulator based on the output of the force detector, and starts motion control of the manipulator based on the output of the force detector after a predetermined time lapses from resetting of the force detector.

APPLICATION EXAMPLE 14

In the robot control apparatus according to Application Example 12, it is preferable that the control unit ends the motion control of the manipulator based on the output of the force detector in response to the command when executing the command for controlling the motion of the manipulator based on the output of the force detector.

APPLICATION EXAMPLE 15

A robot control apparatus according to this application example controls a robot including a manipulator and a force detector that detects a force acting on the manipulator, and includes a control unit in which an executable command and an inexecutable command in a mode of controlling a motion of the manipulator based on an output of the force detector are predetermined.

APPLICATION EXAMPLE 16

In the robot control apparatus according to Application Example 15, it is preferable that the control unit executes impedance control when controlling the motion of the manipulator based on the output of the force detector.

APPLICATION EXAMPLE 17

A robot control apparatus according to this application example controls a robot including a manipulator and a force detector that detects a force acting on the manipulator, and includes a control unit that controls a motion of the manipulator by executing a command in which argument objects are hierarchized.

APPLICATION EXAMPLE 18

A robot control apparatus according to this application example controls a robot including a manipulator and a force detector that detects a force acting on the manipulator, and includes a control unit that controls a motion of the manipulator by executing a command having an arbitrary coordinate system defined with respect to a reference coordinate system as an argument.

APPLICATION EXAMPLE 19

A robot according to this application example includes a manipulator and a force detector that detects a force acting on the manipulator, wherein, when a command for operating the manipulator is executed, control of a motion of the manipulator based on an output of the force detector and control of the motion of the manipulator not based on the output of the force detector are switched in response to a parameter of the command.

APPLICATION EXAMPLE 20

A robot system according to this application example includes a robot including a manipulator and a force detector that detects a force acting on the manipulator, and a robot control apparatus including a control unit that controls a motion of the manipulator, and, when executing a command for operating the manipulator, switches between control of the motion of the manipulator based on an output of the force detector and control of the motion of the manipulator not based on the output of the force detector in response to a parameter of the command.

APPLICATION EXAMPLE 21

A robot according to this application example is a robot including a manipulator driven by a drive unit and a force sensor, and the drive unit is controlled based on the force sensor and the manipulator has a display that displays a parameter on a movement state of the manipulator.

In the configuration of the robot of the application example, the display that displays the parameter on the movement state of the manipulator is provided in the manipulator. Thereby, the display may be visually recognized while the manipulator itself is visually recognized, and the movement state of the manipulator displayed by the display may be intuitively recognized. Further, when the manipulator is controlled based on the force sensor, the movement state of the manipulator becomes complex and harder to be predicted, however, the movement state of the manipulator may be easily recognized by visual recognition of the display.

APPLICATION EXAMPLE 22

In the robot according to Application Example 21, it is preferable that the display is attachable to the manipulator.

APPLICATION EXAMPLE 23

In the robot according to Application Example 21 or 22, it is preferable that the parameter includes at least one of a position, a velocity, acceleration of the manipulator, and an acting force acting on the force sensor.

APPLICATION EXAMPLE 24

In the robot according to any one of Application Examples 21 to 23, it is preferable that the parameter includes at least one of a moving direction of the manipulator and a direction of the acting force.

APPLICATION EXAMPLE 25

In the robot according to any one of Application Examples 21 to 24, it is preferable that the display displays the parameter using an arrow indicating a direction.

APPLICATION EXAMPLE 26

In the robot according to any one of Application Examples 21 to 25, it is preferable that the parameter relates to at least one of a real movement state of the manipulator detected by a sensor and a target movement state of the manipulator.

APPLICATION EXAMPLE 27

In the robot according to any one of Application Examples 21 to 26, it is preferable that the manipulator includes a plurality of arm members coupled to each other by joints on both ends, and the display is attached to the arm member and displays the parameter on the movement state of the arm member.

APPLICATION EXAMPLE 28

A robot control apparatus according to this application example includes a drive control unit that controls the drive unit of the robot according to any one of Application Examples 21 to 27, and a display control unit that displays the parameter on the movement state of the manipulator on the display of the manipulator.

APPLICATION EXAMPLE 29

A robot system according to this application example includes the robot according to any one of Application Examples 21 to 27, and a robot control apparatus including a drive control unit that controls the drive unit of the robot and a display control unit that displays the parameter on the movement state of the manipulator on the display of the manipulator.

The functions of the respective means described in the application examples are implemented by a hardware resource having a function specified by the configuration itself, a hardware resource having a function specified by a program, or a combination of the resources. Further, the functions of the respective means are not limited to those implemented by hardware resources physically independent of each other.

BRIEF DESCRIPTION OF THE DRAWINGS

The invention will be described with reference to the accompanying drawings, wherein like numbers reference like elements.

FIG. 11A is a screen configuration diagram showing setting windows of the argument object.

FIG. 11B is a screen configuration diagram showing setting windows of the argument object.

FIG. 11C is a screen configuration diagram showing setting windows of the argument object.

FIG. 12 shows practical examples and comparative examples of program codes.

FIG. 16 shows a list of parameters.

DESCRIPTION OF EXEMPLARY EMBODIMENTS

As below, embodiments of the invention will be explained with reference to the accompanying drawings. In the respective embodiments, corresponding component elements have the same signs and their overlapping explanation may be omitted.

Further, in the following embodiments, a coordinate system defining a space in which a robot is installed is referred to as "robot coordinate system", and the robot coordinate system is a three-dimensional orthogonal coordinate system defined by an X-axis and a Y-axis orthogonal to each other on a horizontal plane and a Z-axis extending in an upward vertical direction as a positive direction. A negative direction along the Z-axis is substantially the same with the direction of gravitational force. A rotation angle about the X-axis is shown by RX, a rotation angle about the Y-axis is shown by RY, and a rotation angle about the Z-axis is shown by RZ. An arbitrary position in the three-dimensional space may be expressed by positions in the X, Y, Z directions and an arbitrary attitude in the three-dimensional space may be expressed by rotation angles in the RX, RY, RZ directions. Hereinafter, the description of "position" may also mean "attitude". The description of "force" may also mean "torque".

First Embodiment

A robot system as the first embodiment of the invention will be explained.

Figure 1:
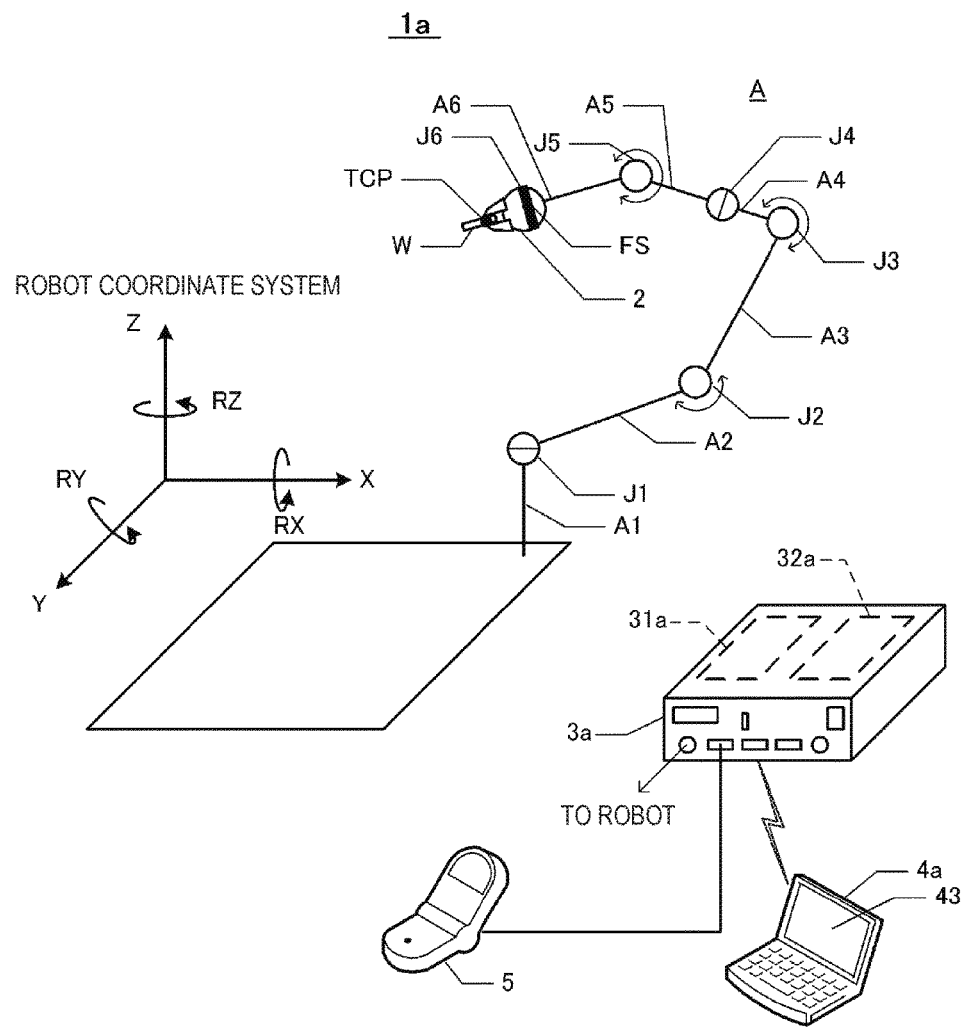
FIG. 1 is a schematic diagram showing a robot system of the first embodiment.

FIG. 1 is a schematic diagram of the robot system according to the first embodiment. As shown in FIG. 1, the robot system of the first embodiment includes a robot 1a, an end effector 2, a control apparatus 3a (controller), a teaching terminal 4a, and a teaching pendant 5. The control apparatus 3a and the teaching terminal 4a are a configuration example of a robot control apparatus according to the invention.

The control apparatus 3a is communicably connected to the robot 1a by a cable (not shown). The control apparatus 3a includes a power supply unit 31a that supplies drive power to the robot 1a and a control unit 32a for controlling the robot 1a.

The teaching terminal 4a is a configuration example of a teaching unit according to the invention. The control apparatus 3a and the teaching terminal 4a are connected by a wired cable or wirelessly communicably connected.

The teaching terminal 4a may be a dedicated computer or a general-purpose computer in which a program for the robot 1a is installed. For example, the teaching pendant 5 as a dedicated device for teaching the robot 1a may be used in place of the teaching terminal 4a. Further, the control apparatus 3a and the teaching terminal 4a may have separate casings as shown in FIG. 1, or may be integrally formed.

The robot 1a is a single-arm robot used with various end effectors 2 attached to an arm A.

The arm A includes six joints J1, J2, J3, J4, J5, J6 and six arm members A1 to A6. The joints J2, J3, J5 are bending joints and the joints J1, J4, J6 are twisting joints. In the arm A, the six arm members A1 to A6 are coupled by the joints J1, J2, J3, J4, J5 and the joint J6 is coupled to the distal end side of the arm member A6. Various end effectors for grasping, processing, etc. of work may be attached to the joint J6. In the embodiment, the explanation will be made with the end effector 2 that grasps work W attached to the distal end of the joint J6.

Namely, in the arm A, the arm member A1, the joint J1, the arm member A2, the joint J2, the arm member A3, the joint J3, the arm member A4, the joint J4, the arm member A5, the joint J5, the arm member A6, the joint J6 are sequentially coupled from the proximal end side, and the end effector 2 is attached to the joint J6 on the most distal end.

A predetermined position on a rotation axis of the joint J6 on the distal end is referred to as "tool center point (TCP)". The arm A and the end effector 2 are a configuration example of a manipulator according to the invention. The position of TCP is used as a reference position for various end effectors 2.

A force sensor FS is provided in the joint J6. The force sensor FS is a six-axis force detector. The force sensor FS detects magnitudes of forces in parallel to three detection axes orthogonal to one another in a sensor coordinate system as an intrinsic coordinate system and magnitudes of torque about the three detection axes. Note that the force sensor FS is a configuration example of a force detector according to the invention, and a force sensor as a force detector may be provided in one or more of the other joints J1 to J5 than the joint J6.

The control apparatus 3a controls the position of TCP in the robot coordinate system by driving the arm A.

Figure 2:
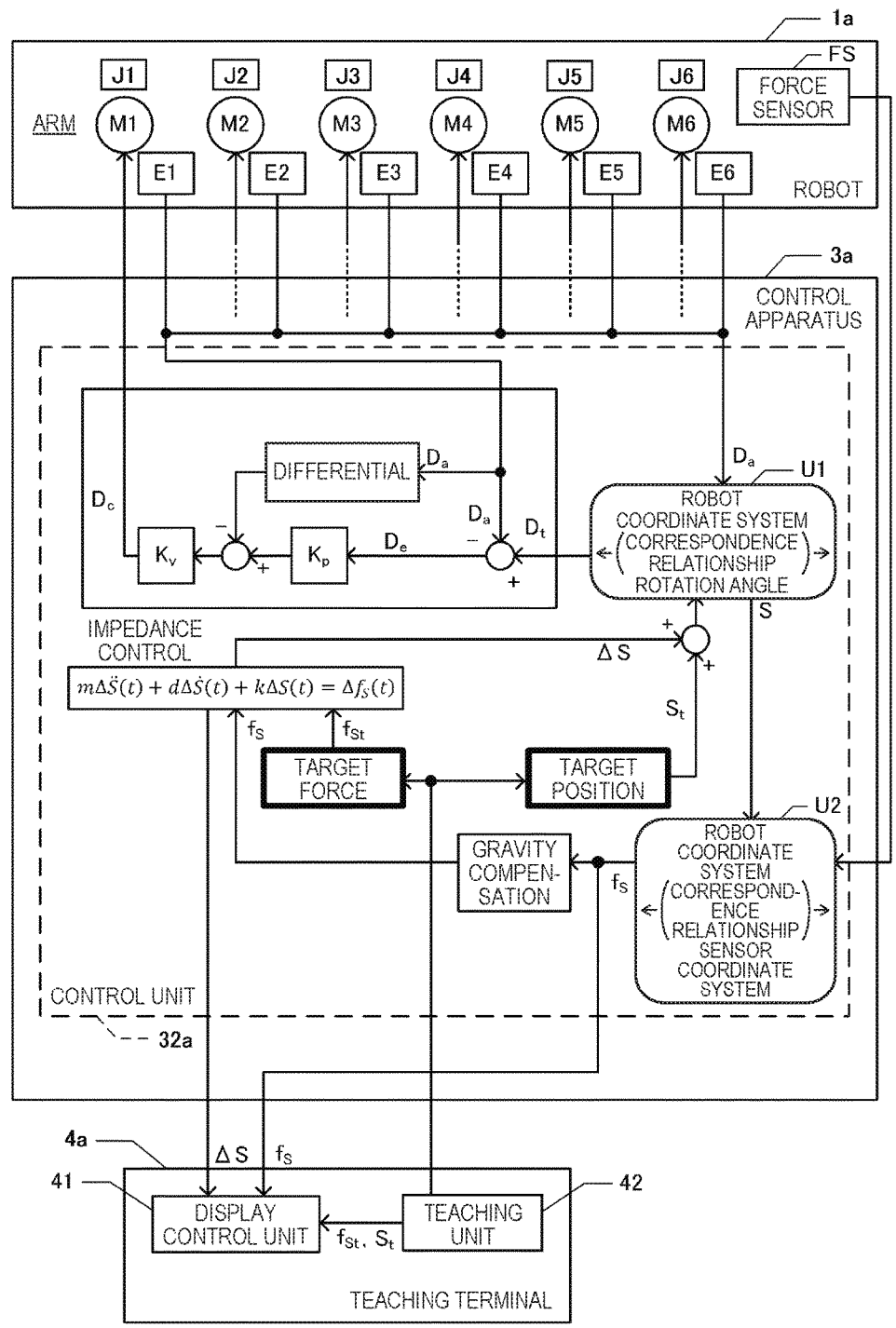
FIG. 2 is a block diagram of the robot system.

FIG. 2 is a block diagram of the robot system. The control unit 32a is a computer in which a control program for control of the robot 1a is installed. The control unit 32a includes a processor, a RAM, and a ROM, and these hardware resources cooperatively operate with the control program.

The robot 1a includes motors M1 to M6 as actuators and encoders E1 to E6 as sensors in addition to the configuration shown in FIG. 1. To control the motors M1 to M6 is to control the arm A.

The motors M1 to M6 and the encoders E1 to E6 are provided to respectively correspond to the joints J1 to J6, and the encoders E1 to E6 detect rotation angles of the motors M1 to M6. The control apparatus 3a stores a correspondence relationship U1 between combinations of the drive positions of the motors M1 to M6 and the positions of TCP in the robot coordinate system. Further, the control apparatus 3a stores a target position $S_t$ and a target force $f_{St}$ as a command with respect to each step of work performed by the robot 1a. The command that determines the target position $S_t$ and the target force $f_{St}$ is set by teaching with respect to each step of the work performed by the robot 1a. Therefore, the target position may be restated as a taught position and the target force may be restated as a taught force.

The control apparatus 3a controls the arm A so that e.g. a target position and a target force set by teaching by a user may be realized in TCP. The target force is a force that should be detected by the force sensor FS in response to a motion of the arm A.

Here, the character S refers to one direction of directions of axes defining the robot coordinate system (X, Y, Z, RX, RY, RZ). Further, S refers to a position in the S direction. For example, when S=X, the X-direction component of the target position set in the robot coordinate system is expressed by $S_t = X_t$, and the X-direction component of the target force is expressed by $f_{St} = f_{Xt}$.

The control apparatus 3a acquires rotation angles $D_a$ of the motors M1 to M6, and then, converts the rotation angles $D_a$ into a position S (X, Y, Z, RX, RY, RZ) of TCP in the robot coordinate system based on the correspondence relationship U1. The control apparatus 3a specifies an acting force $f_S$ actually acting on the force sensor FS in the robot coordinate system based on the position S of TCP and the detection value of the force sensor FS.

The control apparatus 3a stores a correspondence relationship U2 defining the directions of the detection axes in the sensor coordinate system of the force sensor FS with respect to each position S of TCP in the robot coordinate system. Therefore, the control apparatus 3a may specify the acting force $f_S$ in the robot coordinate system based on the position S of TCP in the robot coordinate system and the correspondence relationship U2.

The control apparatus 3a performs gravity compensation on the acting force $f_S$. The gravity compensation is to remove force and torque components due to the gravitational force. The acting force $f_S$ after the gravity compensation may be regarded as another force than the gravitational force acting on the end effector 2.

Impedance control of the embodiment is active impedance control of realizing virtual mechanical impedance using the motors M1 to M6. The control apparatus 3a applies the impedance control to steps under contact conditions of fitting work, polishing work, etc. of the work W at which the end effector 2 is subjected to a force from the work W.

The control apparatus 3a does not apply the impedance control to steps under contactless conditions at which the end effector 2 is not subjected to any force from the work W, but controls the motors M1 to M6 using rotation angles derived by linear operation from the target position.

A mode of controlling the motors M1 to M6 using rotation angles derived by linear operation from the target position is referred to as "position control mode", and a mode of impedance control of the motors M1 to M6 is referred to as "force control mode".

The control apparatus 3a may autonomously switch between the position control mode and the force control mode based on output of the force sensor FS or may switch between the position control mode and the force control mode according to a command.

The control apparatus 3a substitutes the target force $f_{St}$ and the acting force $f_S$ in the equation of motion of the impedance control, and thereby, specifies a force-derived correction amount $\Delta S$. The force-derived correction amount $\Delta S$ refers to a magnitude of the position S to which TCP should move for resolving a force deviation $\Delta f_S(t)$ from the target force $f_{St}$ when TCP is subjected to mechanical impedance. The following equation (1) is the equation of motion of the impedance control.

$$m\Delta \ddot{S}(t) + d\Delta \dot{S}(t) + k\Delta S(t) = \Delta f_S(t) \quad (1)$$

The left side of the equation (1) is formed by a first term of multiplication of a second order differential value of the position S of TCP by a virtual inertia coefficient m, a second term of multiplication of a differential value of the position S of TCP by a virtual viscosity coefficient d, and a third term of multiplication of the position S of TCP by a virtual elastic coefficient k. The right side of the equation (1) is formed by the force deviation $\Delta f_S(t)$ obtained by subtraction of the real acting force $f_S$ from the target force $f_{St}$. The differential in the equation (1) refers to a time differential. At the step performed by the robot 1a, a constant value may be set as the target force $f_{St}$ or a time function may be set as the target force $f_{St}$.

The virtual inertia coefficient m refers to a mass that TCP virtually has, the virtual viscosity coefficient d refers to a viscosity resistance to which TCP is virtually subjected, and the virtual elastic coefficient k refers to a spring constant of an elastic force to which TCP is virtually subjected. The respective coefficients m, d, k may be set to different values with respect to each direction or set to common values regardless of the directions.

The control apparatus 3a specifies a motion position $(S_t + \Delta S)$ in consideration of the impedance control by adding the force-derived correction amount $\Delta S$ to the target position $S_t$.

Then, the control apparatus 3a converts the motion positions $(S_t + \Delta S)$ in the directions of the respective axes defining the robot coordinate system into target angles $D_t$ as target rotation angles of the respective motors M1 to M6. Then, the control apparatus 3a calculates drive position deviations $D_e$ $(=D_t - D_a)$ by subtracting the outputs $(D_a)$ of the encoders E1 to E6 as the real rotation angles $D_a$ of the motors M1 to M6 from the target angles $D_t$. Then, the control apparatus 3a derives control amounts $D_c$ by adding values obtained by multiplication of the drive position deviations $D_e$ by position control gain $K_p$ and values obtained by multiplication of drive velocity deviations as differences from drive velocities as time differential values of the real rotation angles $D_a$ by velocity control gain $K_v$. Note that the position control gain $K_p$ and the velocity control gain $K_v$ may contain control gain not only of proportional components but also of differential components and integral components. The control amounts $D_c$ are specified with respect to each of the motors M1 to M6.

According to the above described configuration, the control apparatus 3a may perform impedance control of the arm A based on the target position $S_t$ and the target force $f_{St}$.

In the teaching terminal 4a, a teaching program for teaching the target position $S_t$ and the target force $f_{St}$ to the control apparatus 3a is installed. The teaching terminal 4a includes a display 43 shown in FIG. 1, a processor, a RAM, and a ROM, and these hardware resources cooperatively operate with the control program. Thereby, as shown in FIG. 2, the teaching terminal 4a functions as a display control unit 41 and a teaching unit 42.

The teaching unit 42 generates a command for designating the target force $f_{St}$ and the target position $S_t$ in response to an operation of a teacher and outputs the command to the control apparatus 3a. The teaching unit 42 displays a teaching window for receiving a command generation instruction on the display 43. The teaching unit 42 generates a command with respect to each step, and defines a series of work by the robot 1a, i.e., a series of motion of the manipulator by the plurality of commands.

The command is described as e.g. "Move P30 FC1 ! D50; g_StepID=9 !". In the description example, "P30 FC1" is set as a target parameter for the command "Move" for instructing movement of TCP. "P30" is a function expressing the target position $S_t$ separately determined with respect to TCP. "FC1" is a function expressing the target force $f_{St}$ separately determined with respect to TCP or the force control coordinate origin. Further, in the command, "g_StepID=9" defines "9" as a step ID with respect to a position where 50 percent of the time scheduled by the Move command lapses from the start of execution of the command expressed by "D50".

The step ID is an identifier of a step sectioned by commands, however, may be used as an identifier with respect to a specific period during the step. The teacher operates the teaching terminal 4a via the teaching window displayed on the display 43 by the teaching unit 42, allows the control apparatus 3a to output those commands, and thereby, may allow the control apparatus 3a to store the target position $S_t$ and the target force $f_{St}$. The group of commands for designating the target position $S_t$ and the target force $f_{St}$ are described in the order of execution and stored as a teaching file containing a series of commands in the control apparatus 3a. The teaching of the embodiment is to allow the robot 1a to store the target position $S_t$ and the target force $f_{St}$ in this manner.

The display control unit 41 acquires the target position $S_t$ and the target force $f_{St}$ set by the teacher from the teaching unit 42, and acquires the force-derived correction amount ΔS and the acting force $f_S$ from the control apparatus 3a. The display control unit 41 derives the motion position based on the target position $S_t$ and the force-derived correction amount ΔS and displays the motion position, the target position, etc. on the monitor window.

The teaching terminal 4a may display the monitor window displayed by the display control unit 41 and the teaching window for receiving input operation of commands by the teaching unit 42 on a single screen of the display 43 or switch the monitor window and the teaching window in response to a request of the teacher. Therefore, the teaching terminal 4a may receive an instruction from the teacher based on a target trajectory and a motion trajectory displayed on the monitor window via the teaching window.

Here, a configuration example of the monitor window on which the display control unit 41 displays the motion position, the target position, etc. is explained. The display control unit 41 places an XY monitor 101, an XZ monitor 102, a YZ monitor 103, an Fx monitor 111, an Fy monitor 112, an Fz monitor 113, a Tx monitor 114, a Ty monitor 115, a Tz monitor 116, a step monitor 121, display section setting boxes 122a, 122b, 122c, an X monitor 131, a Y monitor 132, a Z monitor 133, an Rz monitor 134, an Ry monitor 135, an Rx monitor 136, a step chart 125, and speedometers 141 to 146.

When the teacher designates the teaching file and requests display of the monitor window to the teaching terminal 4a, the display control unit 41 displays the target position, the motion position, the acting force, the force-derived correction amount ΔS, the velocity, etc. on the monitor window with respect to a period (section) from start to end of the series of commands described in the teaching file as will be described later.

The display control unit 41 acquires the target position $S_t$ acquired from the teaching unit 42 and the motion position from the control unit 32a of the control apparatus 3a. Then, the display control unit 41 displays trajectories formed by projection of the three-dimensional target position and the three-dimensional motion position on the same two-dimensional coordinate planes on the XY monitor 101, the XZ monitor 102, and the YZ monitor 103. The longitudinal axes and the lateral axes of the XY monitor 101, the XZ monitor 102, and the YZ monitor 103 indicate positions (mm).

Specifically, the XY monitor 101 is an area in which the trajectories formed by projection of the three-dimensional target position and the three-dimensional motion position on an XY-coordinate plane are displayed. The XZ monitor 102 is an area in which the trajectories formed by projection of the three-dimensional target position and the three-dimensional motion position on an XZ-coordinate plane are displayed. The YZ monitor 103 is an area in which the trajectories formed by projection of the three-dimensional target position and the three-dimensional motion position on a YZ-coordinate plane are displayed.

Figure 3:
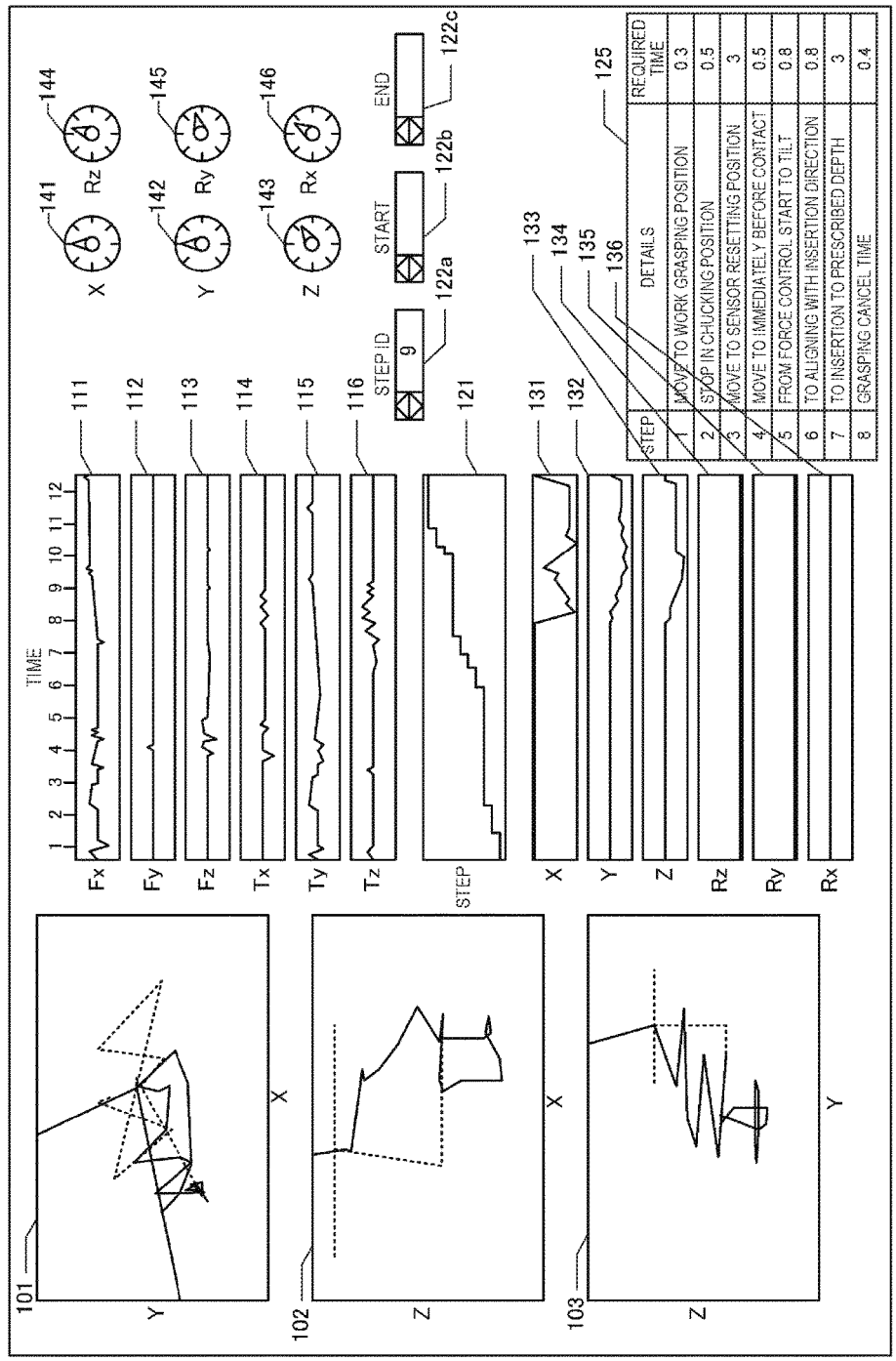
FIG. 3 shows a screen configuration diagram of monitor windows.

Note that any format may be used for displaying the trajectory of the target position and the trajectory of the motion position as long as the two trajectories can be distinguished by e.g. different display colors for the trajectories. In FIG. 3, the trajectory of the target position is displayed by dotted lines and the trajectory of the motion position is displayed by solid lines. Further, regarding parts in which the target position and the motion position coincide, the trajectory of the motion position is displayed by solid lines. In this manner, the target position and the motion position are displayed on the same coordinate plane, and thereby, the teacher may easily understand the target position and the motion position generated when the impedance control is performed and a difference between the positions.

The Fx monitor 111 is an area in which the acting force $f_X$ coordinate-converted from the detection values of the force sensor FS is displayed as a time function in a line graph. The Fy monitor 112 is an area in which the acting force $f_Y$ coordinate-converted from the detection values of the force sensor FS is displayed as a time function in a line graph. The Fz monitor 113 is an area in which the acting force $f_Z$ coordinate-converted from the detection values of the force sensor FS is displayed as a time function in a line graph. The lateral axes of the Fx monitor 111, the Fy monitor 112, and the Fz monitor 113 indicate time (second) and the longitudinal axes indicate force (N).

The Tx monitor 114 is an area in which the acting force $f_{RX}$ coordinate-converted from the detection values of the force sensor FS is displayed as a time function in a line graph. The Ty monitor 115 is an area in which the acting force $f_{RY}$ coordinate-converted from the detection values of the force sensor FS is displayed as a time function in a line graph. The Tz monitor 116 is an area in which the acting force $f_{RZ}$ coordinate-converted from the detection values of the force sensor FS is displayed as a time function in a line graph. The lateral axes of the Tx monitor 114, the Ty monitor 115, and the Tz monitor 116 indicate time (second) and the longitudinal axes indicate torque (Nm).

The step monitor 121 is an area in which a correspondence relationship between the lapse time and the step is displayed. The lateral axis of the step monitor 121 indicates time (second) and the longitudinal axis indicates the step ID. The details of work identified by the step IDs are displayed on the step chart 125.

The display section setting box 122a is a dropdown text box for entry of the step IDs of the steps of displaying the target position, the motion position, etc. on the XY monitor 101, the XZ monitor 102, the YZ monitor 103, the Fx monitor 111, the Fy monitor 112, the Fz monitor 113, the Tx monitor 114, the Ty monitor 115, the Tz monitor 116, the X monitor 131, the Y monitor 132, the Z monitor 133, the Rz monitor 134, the Ry monitor 135, and the Rx monitor 136.

The display section setting box 122b is a dropdown text box for entry of the start times of display of the target position, the motion position, etc. on the XY monitor 101, the XZ monitor 102, the YZ monitor 103, the Fx monitor 111, the Fy monitor 112, the Fz monitor 113, the Tx monitor 114, the Ty monitor 115, the Tz monitor 116, the X monitor 131, the Y monitor 132, the Z monitor 133, the Rz monitor 134, the Ry monitor 135, and the Rx monitor 136.

The display section setting box 122c is a dropdown text box for entry of the end times of display of the target position, the motion position, etc. on the XY monitor 101, the XZ monitor 102, the YZ monitor 103, the Fx monitor 111, the Fy monitor 112, the Fz monitor 113, the Tx monitor 114, the Ty monitor 115, the Tz monitor 116, the X monitor 131, the Y monitor 132, the Z monitor 133, the Rz monitor 134, the Ry monitor 135, and the Rx monitor 136.

The teacher enters the step ID or the start time and the end time in the display section setting boxes 122a, 122b, 122c, and thereby, may display the motion position, the acting force, the force-derived correction amount ΔS, the motion position velocity, etc. in the monitor window with respect to a partial section of the work executed by the series of commands described in the teaching file.

Further, the section may be designated by a combination of the step ID, the start time, and the end time. In this case, the start time and the end time are entered for the lapse time from the start of execution of the command of the entered step ID.

The X monitor 131 is an area in which an X component of the force-derived correction amount ΔS is displayed as a time function in a line graph. The Y monitor 132 is an area in which a Y component of the force-derived correction amount ΔS is displayed as a time function in a line graph. The Z monitor 133 is an area in which a Z component of the force-derived correction amount ΔS is displayed as a time function in a line graph. The lateral axes of the X monitor 131, the Y monitor 132, and the Z monitor 133 indicate time (second) and the longitudinal axes indicate (mm).

The Rz monitor 134 is an area in which an Rz component of the force-derived correction amount ΔS is displayed as a time function in a line graph. The Ry monitor 135 is an area in which an Ry component of the force-derived correction amount ΔS is displayed as a time function in a line graph. The Rx monitor 136 is an area in which an Rx component of the force-derived correction amount ΔS is displayed as a time function in a line graph. The lateral axes of the Rz monitor 134, the Ry monitor 135, and the Rx monitor 136 indicate time (second) and the longitudinal axes indicate (degree).

The speedometer 141 is an area in which an X component of the velocity of the motion position is displayed by a revolving pointer. The speedometer 142 is an area in which a Y component of the velocity of the motion position is displayed by a revolving pointer. The speedometer 143 is an area in which a Z component of the velocity of the motion position is displayed by a revolving pointer. The units of the speedometers 141 to 143 are mm/second. The speedometer 144 is an area in which an RZ component of the velocity of the motion position is displayed by a revolving pointer. The speedometer 145 is an area in which an RY component of the velocity of the motion position is displayed by a revolving pointer. The speedometer 146 is an area in which an RX component of the velocity of the motion position is displayed by a revolving pointer. The units of the speedometers 144 to 146 are degree/second.

The display control unit 41 switches the display format of the monitor window in response to the mode in the following manner. In a real-time mode, the motion position, the acting force, the force-derived correction amount ΔS, the motion position velocity, etc. as a motion result of the robot 1a by command execution are displayed in the monitor window in real time during the motion of the robot 1a, i.e., in synchronization with the motion of the robot 1a except inevitable delays due to hardware performance.

Therefore, in the real-time mode, the display control unit 41 derives the motion position while acquiring the force-derived correction amount and the acting force from the control apparatus 3a and draws the trajectory of the motion position. In a reproduction mode, the motion position, the acting force, the force-derived correction amount ΔS, the motion position velocity, etc. as a motion result of the robot 1a by command execution are displayed as moving images in the monitor window based on logs. The logs are acquired from the control apparatus 3a by the teaching unit 42 or the display control unit 41 during command execution and stored in the RAM.

Figure 4A:
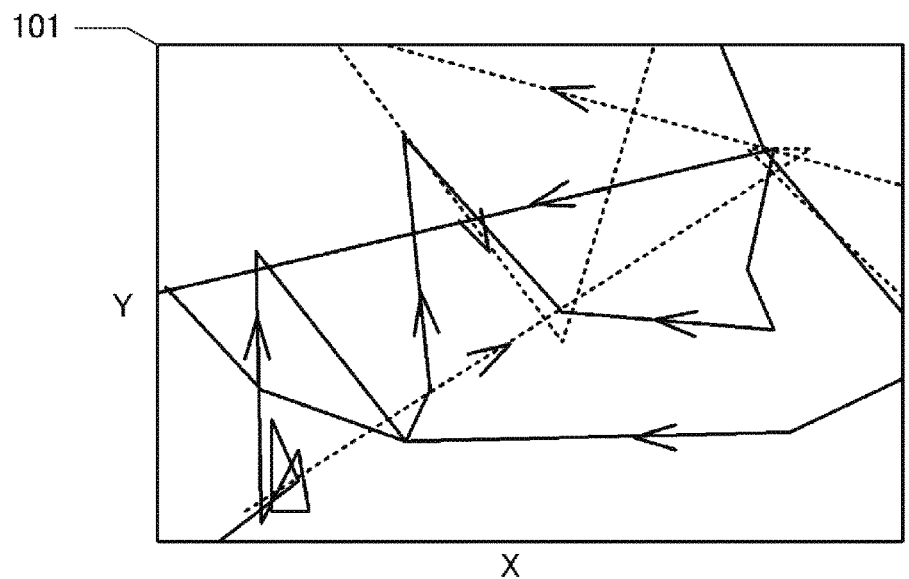
FIG. 4A shows a window configuration of an XY monitor.
Figure 4B:
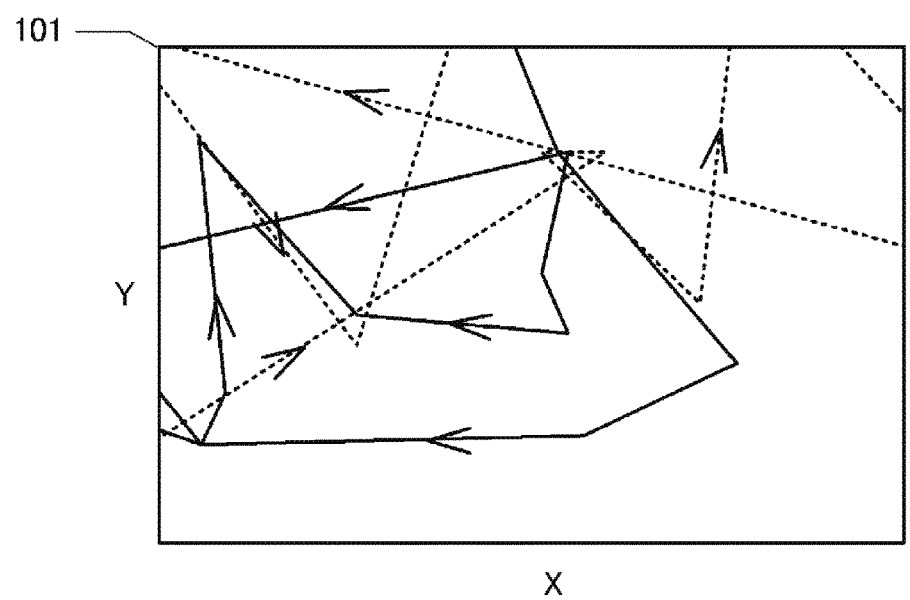
FIG. 4B shows a window configuration of the XY monitor.

Further, the display control unit 41 changes object areas and display magnifications for display of the trajectories of the target position and the motion position on the XY monitor 101, the XZ monitor 102, and the YZ monitor 103 in response to a request of the teacher. Specifically, for example, if a display magnification change request is acquired from the teacher in the state in which the XY monitor 101 is displayed as shown in FIG. 3, the display control unit 41 may reduce the object area in which the trajectories of the target position and the motion position are displayed on the XY monitor 101 and increase the display magnification of the trajectories as shown in FIG. 4A. When a display area change request is acquired from the teacher in the state in which the XY monitor 101 is displayed as shown in FIG. 4A, the display control unit 41 may change the object area in which the trajectories of the target position and the motion position are displayed on the XY monitor 101 with the display magnification maintained as shown in FIG. 4B. The display control unit 41 may acquire the display magnification change request and the display area change request from the teacher using a keyboard, a mouse, a touch panel, or the like.

Furthermore, the display control unit 41 may display moving directions (directions of change of the target position and the motion position) of TCP on the trajectories of the target position and the motion position as shown in FIG. 4A. For example, the moving directions may be displayed on the trajectories by arrows with respect to each step, the moving directions may be displayed by one arrow for a predetermined number (two or more) of continuous steps, or the moving directions may be displayed by respective single arrows for the trajectory of the target position and the trajectory of the motion position through the whole process. The format indicating the moving direction may be a figure of a triangle or the like.

According to the above described first embodiment, the target position and the motion position are comparably displayed on the screen, and the teacher may set parameters (the target position and the target force) of the command while verifying the target position and the motion position in the force control mode. Therefore, work for optimizing the parameters of the command may be easier and the time taken for teaching may be shortened. Further, the target position and the motion position are displayed in the same coordinate system, and thereby, the comparison between the target position and the motion position is even easier. Furthermore, the trajectories of the target position and the motion position may be displayed, the target position and the motion position may be displayed in moving images, the directions of change of the target position and the motion position may be displayed, the display sections of the target position and the motion position may be set, and thereby, the comparison between the target position and the motion position is even easier.

Second Embodiment

1. Configuration of Robot System

A robot system as the second embodiment of the invention will be explained.

Figure 5:
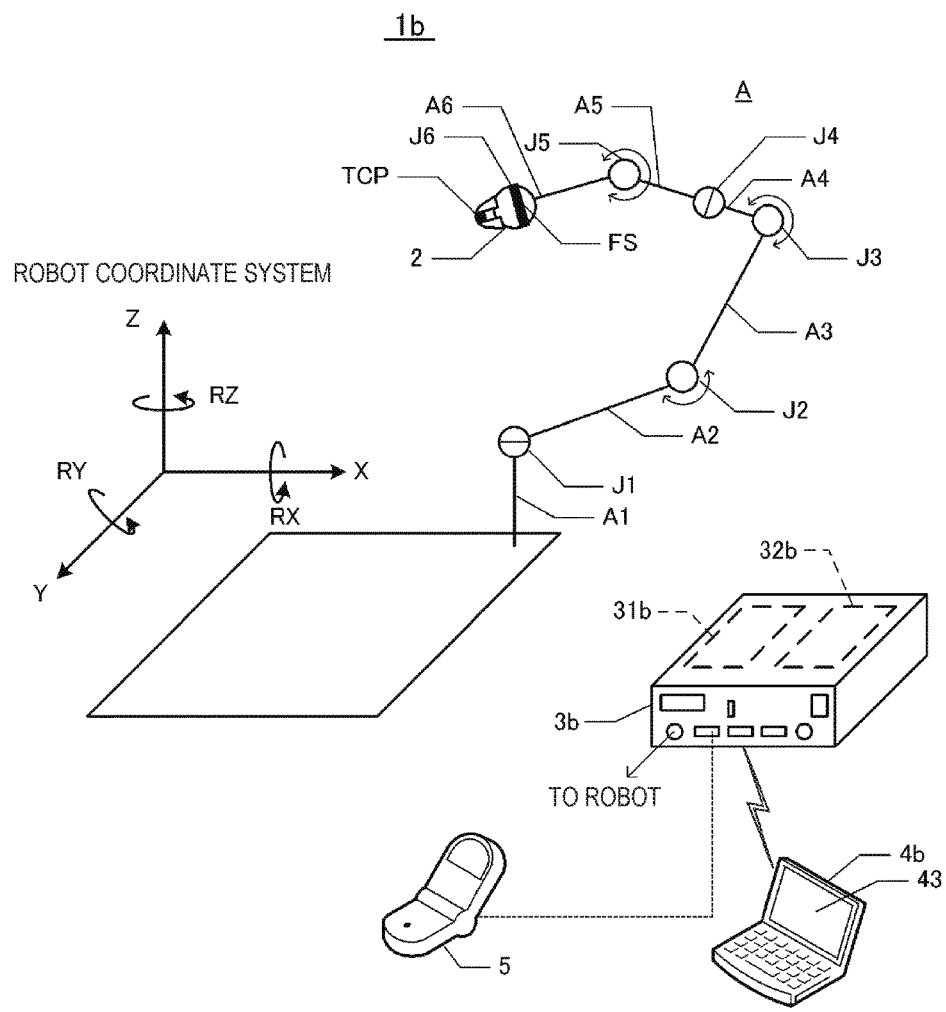
FIG. 5 is a schematic diagram showing a robot system of the second embodiment.

FIG. 5 is a schematic diagram showing a robot system according to the second embodiment. As shown in FIG. 5, the robot system of the second embodiment includes a robot 1b, an end effector 2, a control apparatus 3b, and a teaching apparatus 4b (teaching pendant). The control apparatus 3b is a configuration example of the robot control apparatus according to the invention.

The control apparatus 3b is communicably connected to the robot 1b by a cable (not shown). Note that the component elements of the control apparatus 3b may be provided in the robot 1b. The control apparatus 3b includes a power supply unit 31b that supplies drive power to the robot 1b and a control unit 32b for controlling the robot 1b. The control apparatus 3b and the teaching apparatus 4b are connected by a cable or wirelessly communicably connected.

The teaching apparatus 4b may be a dedicated computer or a general-purpose computer in which a program for teaching the robot 1a is installed. For example, a teaching pendant 5 as a dedicated device for teaching the robot 1b may be used in place of the teaching apparatus 4b. Further, the control apparatus 3b and the teaching apparatus 4b may have separate casings as shown in FIG. 5, or may be integrally formed.

The robot 1b is a single-arm robot used with various end effectors 2 attached to an arm A.

The arm A has the same configuration as that of the first embodiment and the explanation will be omitted. Various end effectors 2 for grasping, processing, etc. of work are attached to the joint J6. A predetermined position on a rotation axis of the joint J6 on the distal end is referred to as "tool center point (TCP)". The position of TCP is used as a reference position for various end effectors 2. The arm A and the end effector 2 are a configuration example of the manipulator according to the invention.

A force sensor FS is provided in the joint J6. The force sensor FS has the same configuration as that of the first embodiment, and the explanation will be omitted. Note that the force sensor FS is a configuration example of the force detector according to the invention, and a force sensor as a force detector may be provided in one or more of the other joints J1 to J5 than the joint J6.

The control apparatus 3b controls the position of TCP in the robot coordinate system by driving the arm A.

Figure 6:
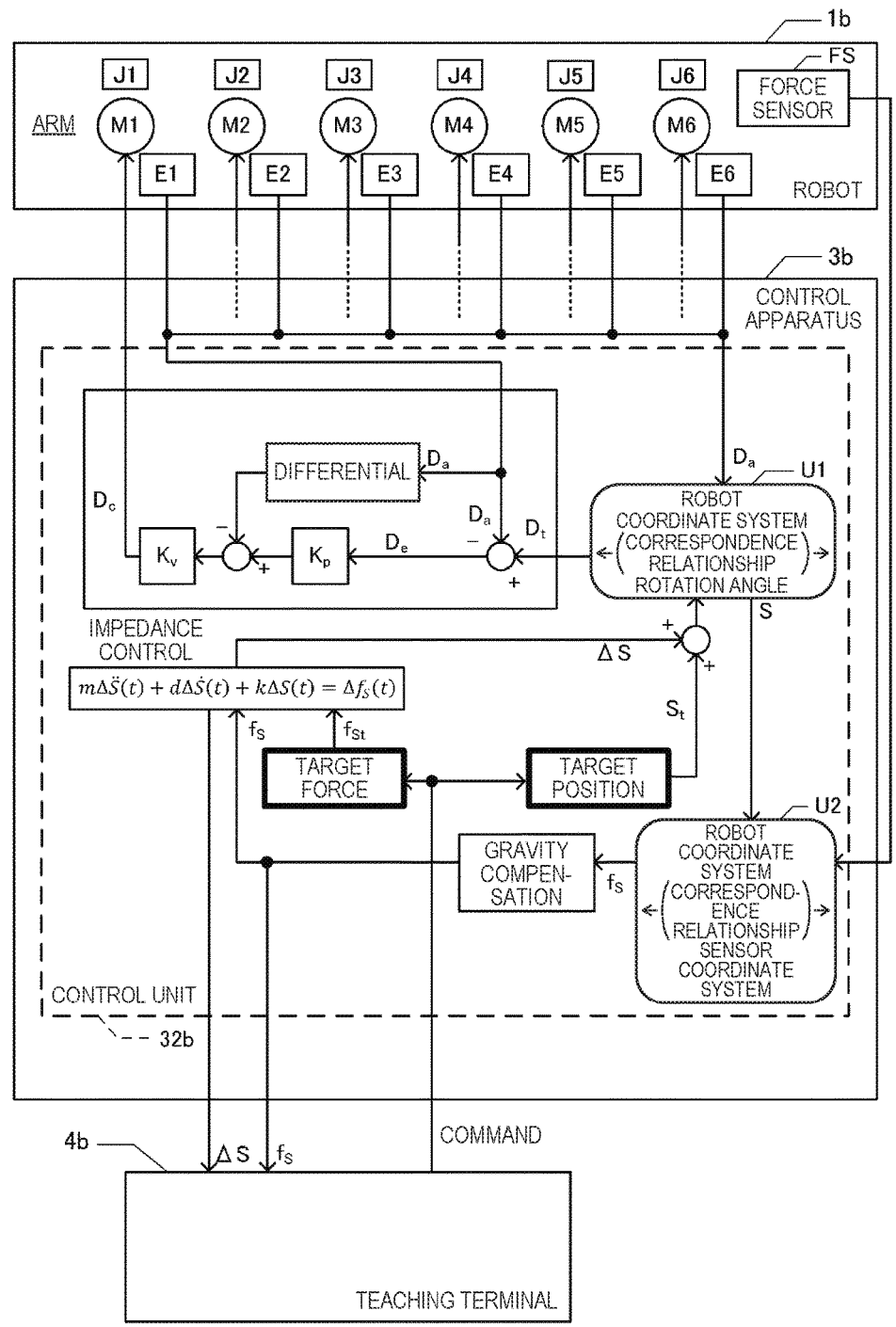
FIG. 6 is a block diagram of the robot system.

FIG. 6 is a block diagram of the robot system. The control unit 32b is a computer in which a control program for control of the robot 1b is installed. The control unit 32b includes a processor, a RAM, a ROM, and a CPU and these hardware resources cooperatively operate with the program to control the robot 1b.

The robot 1b includes motors M1 to M6 as actuators and encoders E1 to E6 as sensors in addition to the configuration shown in FIG. 5. To control the arm A is to control the motors M1 to M6.

The motors M1 to M6 and the encoders E1 to E6 are provided to respectively correspond to the joints J1 to J6, and the encoders E1 to E6 detect rotation angles of the motors M1 to M6. The control apparatus 3b stores a correspondence relationship U1 between combinations of the rotation angles of the motors M1 to M6 and the positions of TCP in the robot coordinate system. Further, the control apparatus 3b stores at least one of a target position $S_t$ and a target force $f_{St}$ based on a command with respect to each step of work performed by the robot 1b. The command having the target position $S_t$ and the target force $f_{St}$ as arguments (parameters) is set with respect to each step of the work performed by the robot 1b.

The control apparatus 3b controls the arm A according to the command so that the set target position and target force may be realized in TCP. The target force is a force that should be detected by the force sensor FS in response to a motion of the arm A. Here, the character S refers to one direction of directions of axes defining the robot coordinate system (X, Y, Z, RX, RY, RZ). Further, S refers to a position in the S direction. For example, when S=X, the X-direction component of the target position set in the robot coordinate system is expressed by $S_t=X_t$, and the X-direction component of the target force is expressed by $f_{St}=f_{Xt}$.

The control apparatus 3b acquires rotation angles $D_a$ of the motors M1 to M6, and then, converts the rotation angles $D_a$ into a position S (X, Y, Z, RX, RY, RZ) of TCP in the robot coordinate system based on the correspondence relationship U1. Further, the control apparatus 3b specifies an acting force $f_S$ actually acting on the force sensor FS in the robot coordinate system based on the position S of TCP and the detection value of the force sensor FS. The point of action of the acting force $f_S$ is defined as the origin O separately from TCP. The origin O corresponds to a point at which the force sensor FS detects a force.

Note that the control apparatus 3b stores a correspondence relationship U2 defining the directions of the detection axes in the sensor coordinate system of the force sensor FS with respect to each position S of TCP in the robot coordinate system. Therefore, the control apparatus 3b may specify the acting force $f_S$ in the robot coordinate system based on the position S of TCP in the robot coordinate system and the correspondence relationship U2.

Further, torque acting on the robot may be calculated from the acting force $f_S$ and a distance from a tool contact point (a contact point between the end effector 2 and the work) to the force sensor FS, and specified as an fs torque component (not shown).

The control apparatus 3b performs gravity compensation on the acting force $f_S$. The gravity compensation is to remove force and torque components due to the gravitational force from the acting force $f_S$. The acting force $f_S$ after the gravity compensation may be regarded as another force than the gravitational force acting on the end effector 2.

Impedance control of the embodiment is active impedance control of realizing virtual mechanical impedance using the motors M1 to M6. The control apparatus 3b applies the impedance control to steps under contact conditions of fitting work, polishing work, etc. of work at which the end effector 2 is subjected to a force from an object (work). In the impedance control, the rotation angles of the motors M1 to M6 are derived by substitution of the target force in the equation of motion, which will be described later.

The signals used for control of the motors M1 to M6 by the control apparatus 3b are PWM (Pulse Width Modulation)-modulated signals. A mode of deriving the rotation angles from the target force based on the equation of motion and controlling (impedance control) the motors M1 to M6 is referred to as "force control mode". Further, the control apparatus 3b controls the motors M1 to M6 using the rotation angles derived from the target position by linear operation at the steps under contactless conditions at which the end effector 2 is not subjected to any force from the work. A mode of controlling the motors M1 to M6 using the rotation angles derived from the target position by linear operation is referred to as "position control mode".

The control apparatus 3b also controls the robot 1b in a hybrid mode of integrating the rotation angles derived from the target position by linear operation and the rotation angles derived by subtraction of the target force in the equation of motion by e.g. linear combination and controlling the motors M1 to M6 using the integrated rotation angles.

The control apparatus 3b may autonomously switch the position control mode, the force control mode, and the hybrid mode based on detection values of the force sensor FS or the encoders E1 to E6, or may switch the position control mode, the force control mode, and the hybrid mode according to a command.

According to the configuration, the control apparatus 3b may drive the arm A so that the end effector 2 may take a target attitude in a target position and target force and moment may act on the end effector 2.

The control apparatus 3b substitutes the target force $f_{St}$ and the acting force $f_S$ in the equation of motion of the impedance control, and thereby, specifies a force-derived correction amount $\Delta S$. The force-derived correction amount $\Delta S$ refers to a magnitude of the position S to which TCP should move for resolving a force deviation $\Delta f_S(t)$ from the target force $f_{St}$ when TCP is subjected to mechanical impedance. The following equation (1) is the equation of motion of the impedance control.

$$m\Delta\ddot{S}(t)+d\Delta\dot{S}(t)+k\Delta S(t)=\Delta f_S(t) \tag{1}$$

The left side of the equation (1) is formed by a first term of multiplication of a second order differential value of the position S of TCP by a virtual inertia coefficient m, a second term of multiplication of a differential value of the position S of TCP by a virtual viscosity coefficient d, and a third term of multiplication of the position S of TCP by a virtual elastic coefficient k. The right side of the equation (1) is formed by the force deviation $\Delta f_S(t)$ obtained by subtraction of the real acting force $f_S$ from the target force $f_{St}$. The differential in the equation (1) refers to a time differential. At the step performed by the robot 1b, a constant value may be set as the target force $f_{St}$ or a time function may be set as the target force $f_{St}$.

The virtual inertia coefficient m refers to a mass that TCP virtually has, the virtual viscosity coefficient d refers to a viscosity resistance to which TCP is virtually subjected, and the virtual elastic coefficient k refers to a spring constant of an elastic force to which TCP is virtually subjected. The respective coefficients m, d, k may be set to different values with respect to each direction or set to common values regardless of the directions.

Then, the control apparatus 3b converts the motion positions in the directions of the respective axes defining the robot coordinate system into target angles $D_t$ as target rotation angles of the respective motors M1 to M6. Then, the control apparatus 3b calculates drive position deviations $D_e$ ($=D_t-D_a$) by subtracting the outputs ($D_a$) of the encoders E1 to E6 as the real rotation angles $D_a$ of the motors M1 to M6 from the target angles $D_t$.

Then, the control apparatus 3b derives control amounts $D_c$ by adding values obtained by multiplication of the drive position deviations $D_e$ by position control gain $K_p$ and values obtained by multiplication of drive velocity deviations as differences from drive velocities as time differential values of the real rotation angles $D_a$ by velocity control gain $K_v$. Note that the position control gain $K_p$ and the velocity control gain $K_v$ may contain control gain not only of proportional components but also of differential components and integral components. The control amounts $D_c$ are specified with respect to each of the motors M1 to M6.

According to the above described configuration, the control apparatus 3b may control the arm A in the force control mode based on the target force $f_{St}$. In the hybrid mode, the control apparatus 3b specifies the motion position ($S_t+\Delta S$) by adding the force-derived correction amount $\Delta S$ to the target position $S_t$.

In the teaching apparatus 4b, a teaching program for generating an execution program having the target position $S_t$ and the target force $f_{St}$ as arguments in the control apparatus 3b and loading the program in the control apparatus 3b is installed. The teaching apparatus 4b includes a display 43, a processor, a RAM, and a ROM, and these hardware resources cooperatively operate with the teaching program to generate the execution program.

2. Execution Program

The execution program is described using a predetermined programming language, and converted into a machine language program through an intermediate language by a translator program. The CPU of the control unit 32b executes the machine language program in a clock cycle. The translator program may be executed by the teaching apparatus 4b or executed by the control apparatus 3b. A command of the execution program is formed by a main body and an argument.

The command includes a motion control command for operating the arm A and the end effector 2, a monitor command for reading out the detection values of the encoders and the sensors, a setting command for setting various variables, etc. Note that, in the embodiment, the execution of the command is synonymous with the execution of the machine language program in which the command is translated.

Figures 7, 8:
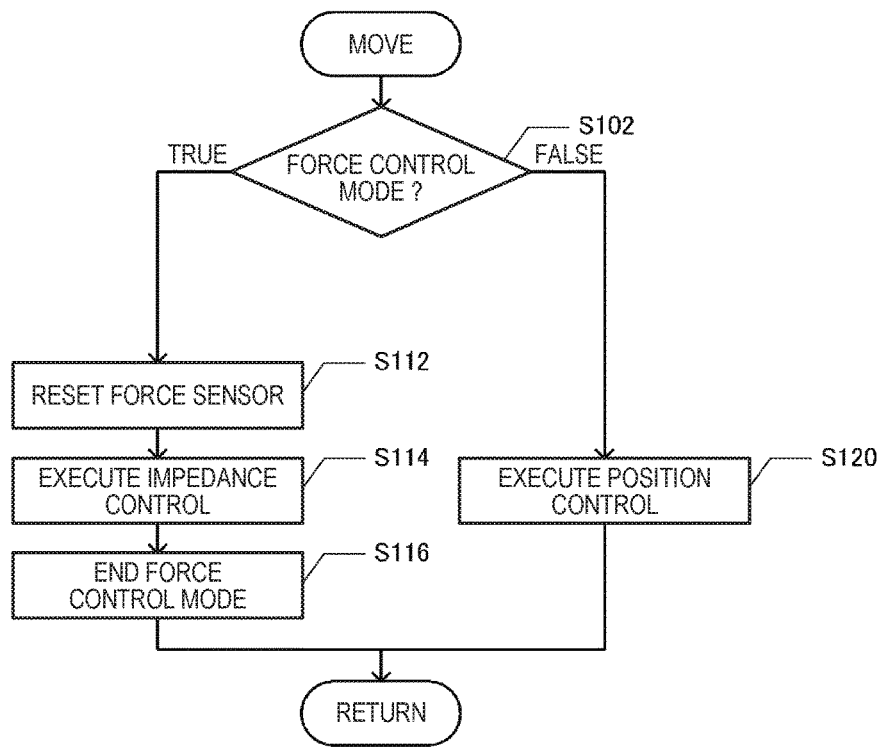
FIG. 7 is a table showing motion control commands executed in a control apparatus.
FIG. 8 is a flowchart showing a processing sequence when a force control-associated command is executed.

FIG. 7 shows examples of motion control commands (main bodies) executed in the control apparatus. As shown in FIG. 7, the motion control command includes a force control-associated command that enables operation of the arm A in the force control mode and a position control command that does not enable operation of the arm A in the force control mode.

In the force control-associated command, ON of the force control mode may be specified by an argument. When ON of the force control mode is not specified by the argument, the force control-associated command is executed in the position control mode, and when ON of the force control mode is specified by the argument, the force control-associated command is executed in the force control mode.

Further, the force control-associated command is executable in the force control mode, and the position control command is inexecutable in the force control mode. Syntax error check by the translator program is executed so that the position control command may not be executed in the force control mode.

Furthermore, in the force control-associated command, continuation of the force control mode may be specified by an argument. When the continuation of the force control mode is specified by the argument in the force control-associated command executed in the force control mode, the force control mode is continued and, when the continuation of the force control mode is not specified by the argument, the force control mode ends before completion of the execution of the force control-associated command.

That is, even when the force control-associated command is executed in the force control mode, the force control mode autonomously ends in response to the force control-associated command unless the continuation is explicitly specified by the argument, and the force control mode does not continue after the execution of the force control-associated command ends.

Note that, in FIG. 7, "CP" is a classification of commands for designation of the moving direction, "PTP" is a classification of commands for designation of the target position, and "CP+PTP" is a classification of commands for designation of the moving direction and the target position.

Here, the execution procedure of the force control-associated command, i.e., the motion (processing) sequence of the control unit 32b will be explained with reference to FIG. 8 by taking the case where the execution is started when On of the force control mode is specified by the argument, but "Move" command in which continuation of the force control mode is not specified is not in the force control mode as an example.

First, the control unit 32b determines whether there is an argument of specifying On of the force control mode (true) or not (false) (S102).

If there is an argument of specifying On of the force control mode, the control unit 32b resets the force sensor FS (S112). To reset the force sensor FS is to set an offset value stored by the force sensor FS itself or the control unit 32b so that the output of the force sensor FS may be detected as zero at the reset time.

Subsequently, the control unit 32b transitions to the force control mode and executes the impedance control, and thereby, operates the arm A (S114). In other words, the control unit 32b controls the rotation angles of the motors M1 to M6 based on the output of the force sensor FS. Here, the target force may be designated as an argument of the force control-associated command or designated in a setting command to be executed prior to the force control-associated command.

Switching from the position control mode to the force control mode is performed by e.g. an operation of turning the entry of $\Delta S$ to on and turning the entry of $S_t$ to off (zero) in an arithmetic element in which $\Delta S$ and $S_t$ are added as shown in FIG. 6.

Subsequently, the control unit 32b ends the force control mode (S116). Switching from the force control mode to the position control mode is performed by e.g. an operation of turning the entry of $\Delta S$ to off (zero) and turning the entry of $S_t$ to on in the arithmetic element in which $\Delta S$ and $S_t$ are added as shown in FIG. 6.

At S102, if there is not an argument of specifying ON of the force control mode, the control unit 32b executes position control in the position control mode, and thereby, operates the arm A (S120). In other words, the control unit 32b controls the rotation angles of the motors M1 to M6 using the rotation angles derived by linear operation from the target position.

Figure 9A:
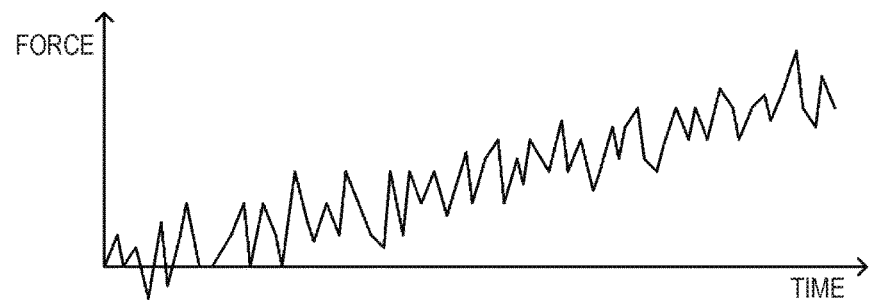
FIG. 9A is a line graph showing output of a force sensor.
Figure 9B:
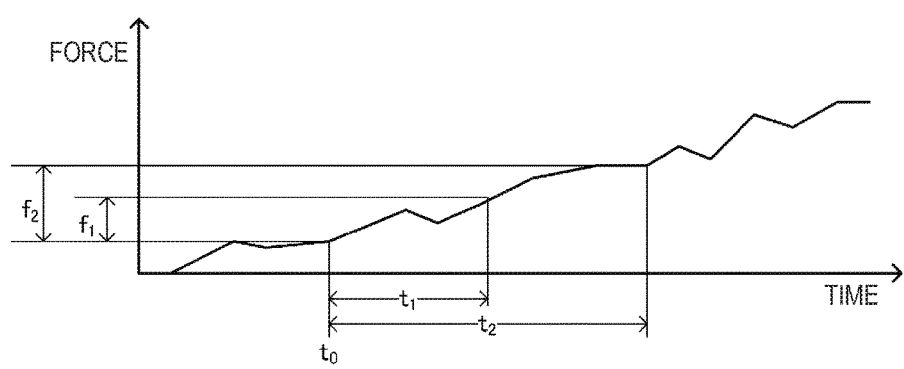
FIG. 9B is a line graph showing output of the force sensor.

Now, in the force sensor using crystal as the piezoelectric element, even when there is no change in the force applied to the force sensor, as shown in FIG. 9A, the output tends to increase with the lapse of time. Therefore, for example, assuming that the force control mode turns ON at time $t_0$ shown in FIG. 9B, even when the same force is applied, a result that a force $f_1$ detected at the time after $t_1$ lapses from $t_0$ and a force $f_2$ detected at the time after $t_2$ lapses from $t_0$ are different is obtained.

In the embodiment, as described above, the mode transitions to the force control mode at the time when the force control-associated command is executed and the force sensor FS is reset, and thus, the motion of the arm A may be controlled based on the output of the force sensor FS with the time when the force control-associated command is executed as reference. Accordingly, reproducibility of force control for the arm A may be improved.

For example, when the resetting of the force sensor FS is not synchronized with the motion control command, in other words, when the force sensor FS is reset prior to the execution of the motion control command, the execution of the motion control command delays for about 3 msec ($t_2-t_1$). Assuming that the force control is executed at intervals of 10 msec, the 3 msec is a large delay relative to the interval of the force control, and the reproducibility is deteriorated.

Figure 10:
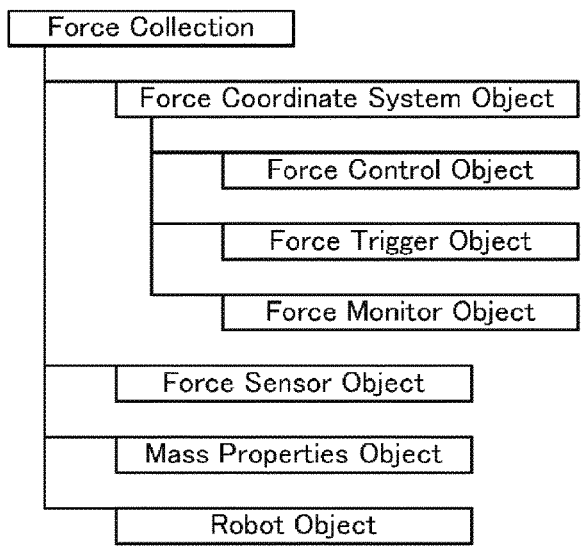
FIG. 10 is a diagram for explanation of a hierarchic structure of argument objects.

The argument of the command of the execution program has a hierarchized object structure. FIG. 10 shows classes of the argument relating to the force control command.

"Force Coordinate System Object" is a class used for setting of a coordinate system and may be defined by FCSx (x is an arbitrary integer). "Force Control Object" is a class used for setting of a coordinate axis or the like as an object of force control and may be defined by FCx (x is an arbitrary integer). "Force Trigger Object" is a class used for setting of a branch condition, a stop condition, and interrupt and may be defined by FTx (x is an arbitrary integer). "Force Monitor Object" is a class used for setting of acquirement of force data, log record, or the like and may be defined by FMx (x is an arbitrary integer).

The coordinate system designated by "Force Control Object", "Force Trigger Object", and "Force Monitor Object" is a coordinate system defined by "Force Coordinate System Object". That is, "Force Control Object", "Force Trigger Object", and "Force Monitor Object" are lower layer classes belonging to "Force Coordinate System Object" as an upper layer class.

"Force Sensor Object" is a class used for setting of control of the force sensor FS and information acquisition from the force sensor FS and may be defined by FSx (x is an arbitrary integer). "Mass Properties Object" is a class used for setting of a center of gravity and may be defined by MPx (x is an arbitrary integer). "Robot Object" is a class used for setting for acquisition of information of the robot 1b relating to the force control and may be defined by Robotx (x is an arbitrary integer).

Next, a method of setting the hierarchized argument will be explained.

FIG. 11A shows a configuration example of a window for setting argument objects of "Force Coordinate System Object" class. FIG. 11A shows a state in which a relative position in the robot coordinate system with reference to TCP of the origin of "Force Coordinate 4" labelled with "Hand Surface 3 Distal End" (an argument object described by FCS4 in the program code) and a relative attitude with reference to the attitude of TCP (the coordinate system fixed to the TCP) are set. Here, the control unit 32b stores the correspondence relationship U1 between combinations of the rotation angles of the motors M1 to M6 and the positions of TCP in the robot coordinate system, and thereby, may define an arbitrary coordinate system with respect to the reference coordinate system by setting of the relative position and attitude to TCP in the argument object of "Force Coordinate System Object" class.

FIG. 11B shows a configuration example of a window in which the argument object of "Force Control Object" class is set. FIG. 11B shows a state in which a coordinate system of "force control 2" labelled with "attitude copy" (an argument object described by FC2 in the program code), an effective axis of the force control, coefficients of the equation of motion of the impedance control (a virtual spring coefficient, a virtual viscosity coefficient, a virtual mass coefficient) are set. Here, "4" is selected as the coordinate system, and accordingly, ON (True) and OFF (False) of the force control are set in the items of "Effective" with respect to each axis of the coordinate system of "Force Coordinate 4" (FCS4) set in the window of FIG. 11A. That is, the direction in which the force control is effective depends on the setting of the object of the upper "Force Coordinate System Object" class.

FIG. 11C shows a configuration example of a window in which the argument object of "Force Trigger Object" class is set. Also, in FIG. 11C, "4" is selected as the coordinate system of "Force Trigger 1" labelled with "contact sense" (an argument object described by FT1 in the program code), and accordingly, a processing condition is determined with respect to each axis of the coordinate system of "Force coordinates 4" (FCS4) set in the window of FIG. 11A. That is, the value and the direction of the vector shown by each variable of the stop condition depend on the setting of the object of the upper "Force Coordinate System Object" class.

As described above, the argument of the command of the embodiment is hierarchized. One coordinate system is set as the object of "Force Coordinate System Object" class, and thereby, the coordinate system may be applied to various commands and the setting work is easier.

Next, FIG. 12 shows practical examples of program codes using the force control-associated command with comparative examples. The practical examples shown in FIG. 12 are program codes in which an argument object "FC1" is defined by six setting commands "Fset", then, the force control-associated command "Move" is executed, and then, "Fz_Target Force" as one of variables of "FC1" object is changed by the setting command "Fset".

In the comparative examples shown in FIG. 12, the argument of the command is not hierarchized, but all setting items used in the force control mode are set at a time by "ForceControl Setting" command. Further, the definitions of the respective arguments sectioned by commas are determined by the number of commas described between the command main body and the arguments. Therefore, it is difficult to promptly understand the meaning of the program codes of the comparative examples. On the other hand, in the embodiment of the invention, the arguments relating to the force control-associated command are set by "Fset" commands with respect to each of the hierarchized object, and thus, interpretation of the meaning of the program codes and the description of the program codes are much easier.

In the command "Move P1 FC1 CF" of the embodiment, in addition to "FC1" object set by the "Fset" commands, "P1" object set by a setting command (not shown) and "CF" are set as arguments. Here, "P1" is an argument that specifies the contact position. "CF" is an argument that specifies the continuation of the force control mode after the execution of the command ends. In the command "Move P1 FC1 CF", the argument object "FC1" of "Force Control Object" is specified and the target position is specified by the argument "P1", and accordingly, when the command "Move P1 FC1 CF" is executed, the force sensor FS is reset and the arm A is controlled in the hybrid mode based on the output of the force sensor FS. Further, the argument "CF" is specified, and thereby, the force control mode continues after the execution of the command ends.

In the comparative examples, "ForceControl On" command is executed, and thereby, the force sensor FS is reset and the arm A becomes controllable based on the output of the force sensor FS. Subsequently, "Move P1" command is executed, and thereby, the arm A is controlled based on the output of the force sensor FS. On the other hand, an actual time after the execution of the command "Move P1 FC1 CF" of the embodiment is started and before the force sensor FS is reset is a constant time predetermined by the clock number of the control unit 32b because corresponding machine language programs are constantly the same. Therefore, as described above, the reproducibility of the force control is assured in the embodiment.

Third Embodiment

Configuration of Robot System

A robot system as the third embodiment of the invention will be explained.

Figure 13:
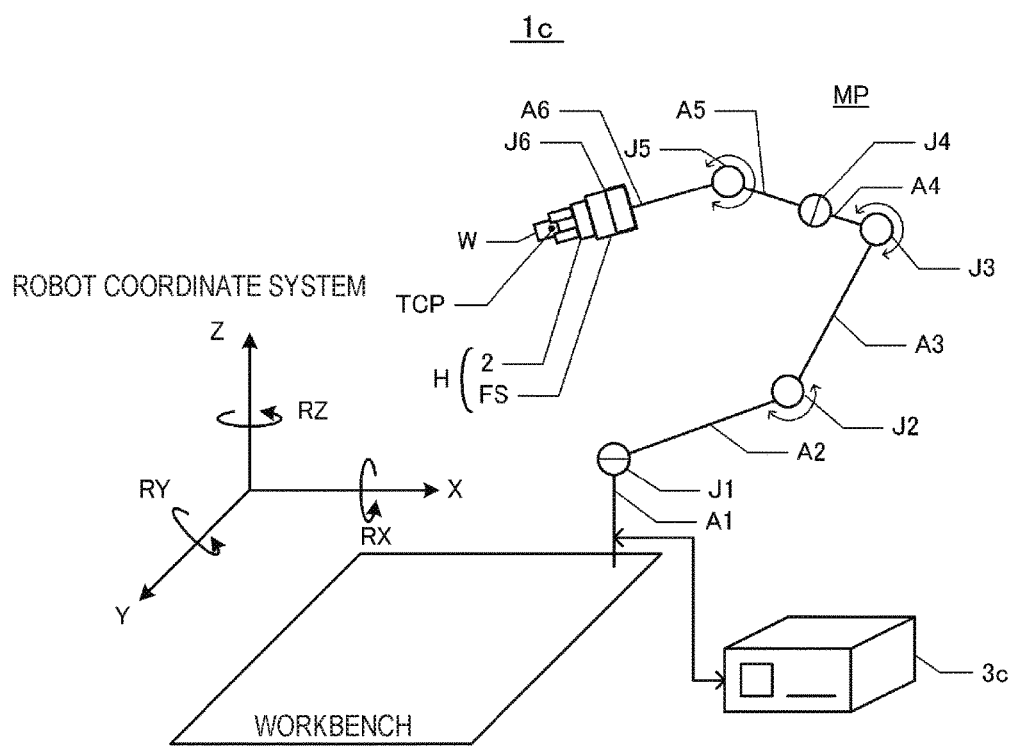
FIG. 13 is a schematic diagram showing a robot system of the third embodiment.

FIG. 13 is a schematic diagram of the robot system according to the third embodiment. As shown in FIG. 13, the robot system of the third embodiment includes a robot 1c and a control apparatus 3c (robot control apparatus). The control apparatus 3c is a configuration example of a robot control apparatus according to the invention.

The control apparatus 3c may be a dedicated computer or a general-purpose computer in which a program for the robot 1c is installed.

The robot 1c is a single-arm robot including one manipulator MP and a force sensor FS, and the manipulator MP includes an arm A, an end effector 2, and a display D.

The arm A has the same configuration as that of the first embodiment and the explanation will be omitted. Joints J1 to J6 exist on both ends of respective arm members A2 to A6. The force sensor FS and the end effector 2 are attached to the joint J6 on the most distal end side of the arm A.

The end effector 2 grasps work W by a gripper. A predetermined position of the end effector 2 is referred to as "tool center point (TCP)". The position of TCP is used as a reference position for the end effector 2.

The force sensor FS is a six-axis force detector. The force sensor FS detects magnitudes of forces in directions of three detection axes orthogonal to one another and magnitudes of torque about the three detection axes.

The control apparatus 3c controls the position of TCP in the robot coordinate system by driving the arm A.

The end effector 2 is immovably fixed relative to the force sensor FS, and it may be regarded that the end effector 2 and the force sensor FS form a single rigid body. Therefore, TCP and the force sensor FS integrally move. That is, the moving distances (including rotation angles), the moving directions (including rotation directions), the velocities (angular velocities), and acceleration (angular acceleration) of TCP and the force sensor FS are the same with each other. Further, the magnitude and the direction of the force detected by the force sensor FS may be regarded to be the same as the magnitude and the direction of the force acting on TCP. Hereinafter, the end effector 2 and the force sensor FS are collectively referred to as "hand part H".

Figure 14A:
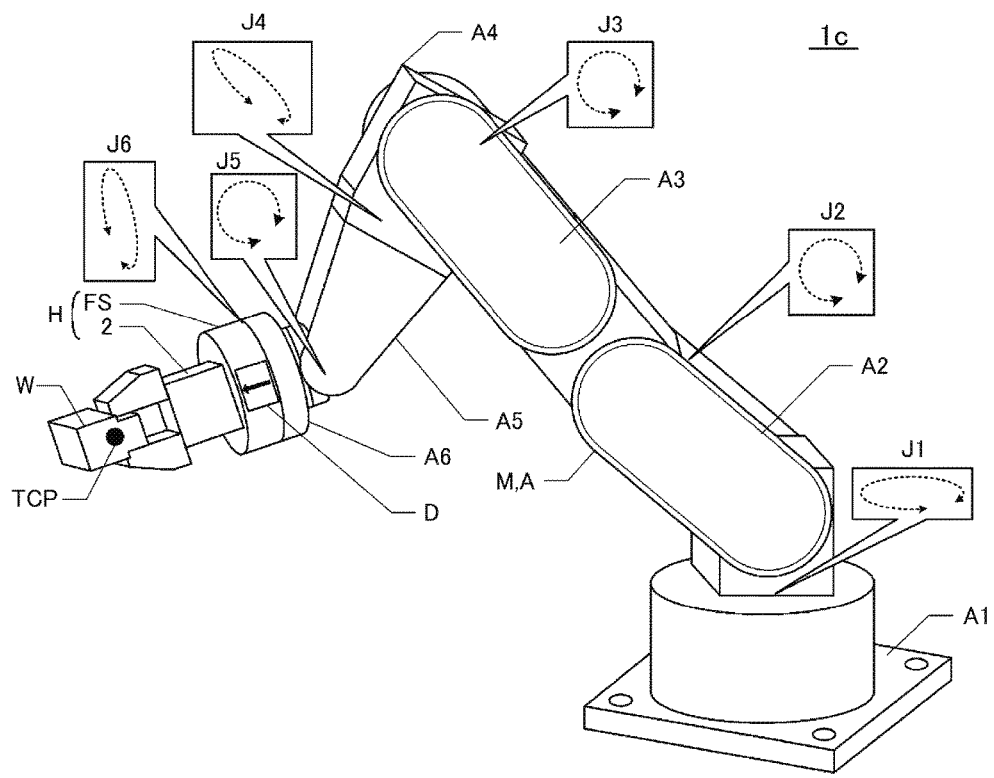
FIG. 14A is a perspective view of a robot.
Figure 14B:
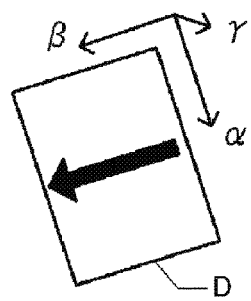
FIG. 14B is a schematic diagram of a display.

FIG. 14A is a perspective view of the robot. Of the robot 1c, the display D is attached to the force sensor FS. The display D may be a liquid crystal display, an organic EL (Electro luminescence) display, or a display in which light emitting devices of LEDs (Light Emitting Diodes) or the like are arranged in a matrix form. The display D displays two-dimensional images, and may be adapted to display monochrome images, gray scale images, or color images. The display D may be formed in a flat plate shape or curved shape following the outer shape of the force sensor FS. In the embodiment, as shown in FIG. 14B, the display D has a rectangular flat plate shape formed by sides in an α-axis direction and a β-axis direction.

Figure 15:
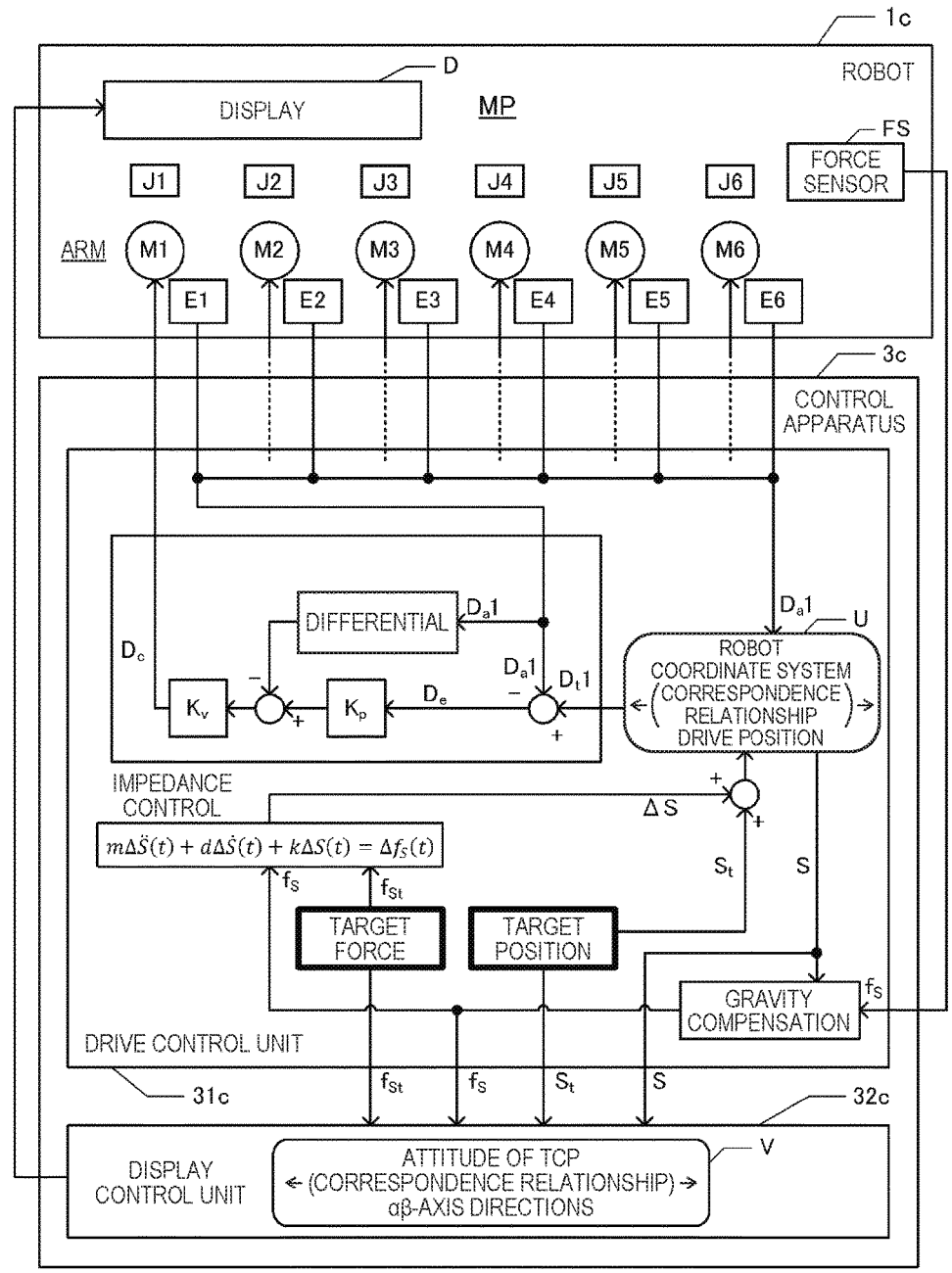
FIG. 15 is a block diagram of the robot system.

FIG. 15 is a block diagram of the robot system. A control program for control of the robot 1c is installed in the control apparatus 3c. The control apparatus 3c has a computer including a processor, a RAM, and a ROM. The computer executes the control program recorded in a recording medium such as the ROM, and thereby, the control apparatus 3c includes a drive control unit 31c and a display control unit 32c as functional configurations. The drive control unit 31c and the display control unit 32c are functional configurations implemented by cooperative operation of hardware resources and software resources of the control apparatus 3c. Note that the drive control unit 31c and the display control unit 32c are not necessarily implemented by the software resources, but may be implemented by an ASIC (Application Specific Integrated Circuit).

The drive control unit 31c controls motors M1 to M6 as drive parts based on the force sensor FS. Specifically, the drive control unit 31c controls the manipulator MP (arm A) based on an output signal of the force sensor FS so that the movement state of the hand part H may be closer to a target movement state. The movement state of the hand part H includes moving states of the respective parts of the manipulator MP and the state of an acting force acting on the manipulator MP. Specifically, the drive control unit 31c controls the arm A so that a target position and a target force may be realized in TCP. The target force is a force that should be detected by the force sensor FS and should act on TCP.

A character S refers to one direction of directions of axes defining the robot coordinate system (X, Y, Z, RX, RY, RZ). For example, when S=X, the X-direction component of the target position set in the robot coordinate system is expressed by $S_t=X_t$, and the X-direction component of the target force is expressed by $f_{St}=f_{Xt}$.

Further, S refers to a position in the S direction (rotation angle).

The robot 1c includes the motors M1 to M6 as drive parts and encoders E1 to E6 in addition to the configuration shown in FIG. 13. The motors M1 to M6 and the encoders E1 to E6 are provided to respectively correspond to the joints J1 to J6, and the encoders E1 to E6 detect drive positions of the motors M1 to M6. To control the arm A is to control the motors M1 to M6 as the drive parts. The drive control unit 31c is communicable with the robot 1c. The drive control unit 31c stores a correspondence relationship U between combinations of the drive positions of the motors M1 to M6 and positions of TCP in the robot coordinate system.

The drive control unit 31c acquires drive positions $D_a1$ of the motors M1 to M6, and then, converts the drive positions $D_a1$ into a position S (X, Y, Z, RX, RY, RZ) in the robot coordinate system based on the correspondence relationship U. The drive control unit 31c specifies an acting force $f_S$ actually acting on the force sensor FS in the robot coordinate system based on the position S of TCP and detection values of the force sensor FS. Note that the force sensor FS detects the detection values in a unique coordinate system, however, the relative positions and directions of the force sensor FS and TCP are stored as known data and the drive control unit 31c may specify the acting force $f_S$ in the robot coordinate system.

The drive control unit 31c performs gravity compensation on the acting force $f_S$. The gravity compensation is to remove gravity components from the acting force $f_S$. The acting force $f_S$ after the gravity compensation may be regarded as another force than the gravitational force acting on TCP. The gravity component of the acting force $f_S$ acting on TPC is previously investigated with respect to each attitude of TCP and the drive control unit 31c subtracts the gravity component corresponding to the attitude of TCP from the acting force $f_S$, and thereby, the gravity compensation is realized.

The drive control unit 31c substitutes the target force $f_{St}$ and the acting force $f_S$ in the equation of motion of the impedance control, and thereby, specifies a force-derived correction amount ΔS. The following equation (1) is the equation of motion of the impedance control.

$$m\Delta\ddot{S}(t)+d\Delta\dot{S}(t)+k\Delta S(t)=\Delta f_S(t) \quad (1)$$

The left side of the equation (1) is formed by a first term of multiplication of a second order differential value of the position S of TCP by a virtual inertia coefficient m, a second term of multiplication of a differential value of the position S of TCP by a virtual viscosity coefficient d, and a third term of multiplication of the position S of TCP by a virtual elastic coefficient k. The right side of the equation (1) is formed by the force deviation $\Delta f_S(t)$ obtained by subtraction of the real acting force $f_S$ from the target force $f_{St}$. The differential in the equation (1) refers to a time differential. At the step performed by the robot 1c, a constant value may be set as the target force $f_{St}$ or a value derived by a function depending on time may be set as the target force $f_{St}$.

The impedance control is control to realize virtual mechanical impedance using the motors M1 to M6. The virtual inertia coefficient m refers to a mass that TCP virtually has, the virtual viscosity coefficient d refers to a viscosity resistance to which TCP is virtually subjected, and the virtual elastic coefficient k refers to a spring constant of an elastic force to which TCP is virtually subjected. The respective parameters m, d, k may be set to different values with respect to each direction or set to common values regardless of the directions.

The force-derived correction amount ΔS refers to a magnitude of the position S to which TCP should move for resolving a force deviation $\Delta f_S(t)$ from the target force $f_{St}$ when TCP is subjected to mechanical impedance. The drive control unit 31c specifies a corrected target position $(S_t+\Delta S)$ in consideration of the impedance control by adding the force-derived correction amount ΔS to the target position $S_t$.

Then, the drive control unit 31c converts the corrected target positions $(S_t+\Delta S)$ in the directions of the respective axes defining the robot coordinate system into target drive positions $D_t1$ as target drive positions of the respective motors M1 to M6. Then, the drive control unit 31c calculates drive position deviations $D_e$ $(=D_t1-D_a1)$ by subtracting the real drive positions $D_a1$ of the motors M1 to M6 from the target drive positions $D_t1$.

The drive control unit 31c specifies control amounts $D_c$ by adding values obtained by multiplication of the drive position deviations $D_e$ by position control gain $K_p$ and values obtained by multiplication of drive velocity deviations as differences from drive velocities as time differential values of the real drive position $D_a1$ by velocity control gain $K_v$. Note that the position control gain $K_p$ and the velocity control gain $K_v$ may contain control gain not only of proportional components but also of differential components and integral components. The control amounts $D_c$ are specified with respect to each of the motors M1 to M6.

According to the above described configuration, the drive control unit 31c may control the arm A based on the target position $S_t$ and the target force $f_{St}$.

The control to make the real acting force $f_S$ equal to the target force $f_{St}$ is the force control and the control to make the real position S of TCP to the target position $S_t$ is the position control. In the embodiment, the drive control unit 31c may perform both the position control and the force control or only the position control in response to the motion. For example, the force-derived correction amount ΔS in FIG. 15 is regarded as constantly zero, and thereby, the unit may substantially perform the position control only regardless of the real acting force $f_S$.

The display control unit 32c controls the display D. The display control unit 32c and the display D are connected via wiring and the display D displays an image represented by display image data output by the display control unit 32c. That is, the display control unit 32c generates the display image data and outputs the display image data to the display D, and thereby, controls display of the display D.

The display control unit 32c allows the display D to display parameters on the movement state of the hand part H. The display control unit 32c acquires the target position $S_t$ and the target force $f_{St}$ from the drive control unit 31c in order to obtain parameters on a target movement state of the hand part H. Further, the display control unit 32c acquires the position S of TCP and the acting force $f_S$ from the drive control unit 31c in order to obtain the parameters on a real movement state of TCP. Note that, in the embodiment, the movement state of the hand part H may be regarded as the same movement states of the force sensor FS and TCP.

The drive control unit 31c updates the target position $S_t$, the target force $f_{St}$, the position S, and the acting force $f_S$ with respect to each minute control period (e.g. 4 msec), and acquires the target position $S_t$, the target force $f_{St}$, the position S, and the acting force $f_S$ with respect to each control period. The drive control unit 31c updates the target position $S_t$, the target force $f_{St}$, the position S, and the acting force $f_S$ with respect to each control period, and thereby, the manipulator MP can be allowed to perform a time-series motion and the manipulator MP can be allowed to perform a motion on which the last movement state is reflected. The drive control unit 31c sets the target position $S_t$ with respect to each control period, and thereby, may move TCP to the final target position.

The drive control unit 31c sets a trajectory of TCP to the final target position, and sequentially sets individual positions of the trajectory divided with respect to the control period under the restriction of the upper limit of the velocity, acceleration, or the like as the target position $S_t$. The display control unit 32c calculates the parameters on the movement state of the hand part H based on the target position $S_t$, the target force $f_{St}$, the position S, and the acting force $f_S$ with respect to each control period.

FIG. 16 shows a list of the parameters on the movement states (the moving state and the force state) of the hand part H. The parameters on the movement states may be classified into parameters of translational movements and parameters of rotational movements. Further, the parameters on the movement states may be classified into target parameters and real parameters. Furthermore, the parameters on the movement states include parameters that can be expressed by numerical values (scalar) and parameters that can be expressed by arrows.

The display control unit 32c calculates a vector from the target position $S_t$ at the last time to the target position $S_t$ at present as a target moving vector in the robot coordinate system. The last time refers to a time before the present by n (n is a natural number) control periods. The n may be arbitrarily set. In the embodiment, n=1. The moving vector is expressed by a moving amount in each axis-direction in the robot coordinate system. Of the moving vectors, a vector formed by the moving amounts in the X, Y, Z directions is referred to as "translational vector" and a vector formed by the moving amounts in the RX, RY, RZ directions is referred to as "rotational vector".

The display control unit 32c calculates square-root of sum of squares of the moving amounts in the X, Y, Z directions forming a target translational vector as a target translational distance. Further, the display control unit 32c divides the target translational distance by a length of one control period, and thereby, calculates a target translational velocity. The display control unit 32c divides a value obtained by subtraction of the target translational velocity at the last time from the target translational velocity at present by a period from the past time to the present, and thereby, calculates translational acceleration. Furthermore, the display control unit 32c accumulates the target translational distances from a predetermined accumulation start time to the present, and thereby, calculates a target accumulated translational distance.

The display control unit 32c calculates square-root of sum of squares of the moving amounts in the RX, RY, RZ directions forming a target rotational vector as a target rotation angle. Further, the display control unit 32c divides the target rotation angle by a length of one control period, and thereby, calculates a target angular velocity. The display control unit 32c divides a value obtained by subtraction of the target angular velocity at the last time from the target angular velocity at present by a period from the past time to the present, and thereby, calculates angular acceleration.

Furthermore, the display control unit 32c accumulates the target rotation angles from an accumulation start time to the present, and thereby, calculates a target accumulated rotation angle. The display control unit 32c performs the same calculation with respect to the real position S, and thereby, calculates real translational distance, accumulated translational distance, translational velocity, acceleration, rotation angle, accumulated rotation angle, rotation velocity, angular velocity, and angular acceleration.

The target force $f_{St}$ is expressed by a vector in the robot coordinate system, and the display control unit 32c extracts components in the X, Y, Z directions of the vector of the target force $f_{St}$ as translational force vectors and calculates square-root of sum of squares of the respective components of the translational force vectors as a magnitude of a target translational force. The display control unit 32c extracts components in the RX, RY, RZ directions of the vector of the target force $f_{St}$ as torque vectors and calculates square-root of sum of squares of the respective components of the torque vectors as a magnitude of target torque.

The display control unit 32c generates display image data of images representing numerical values (characters) of the parameters on the movement state calculated in the above described manner and outputs the data to the display D.

The display control unit 32c displays the parameter by an arrow indicating the direction, and thereby, allows the display D to display the parameter in the direction on the movement state. Here, the display D and TCP integrally move, and accordingly, directions of the α, β axes referring to directions of sides forming the outer periphery of the display D also change in response to the attitude (RX, RY, RZ) of TCP in the robot coordinate system. A correspondence relationship V between the attitudes of TCP and the directions of the α, β axes of the display D in the robot coordinate system are recorded in a recording medium, so that the display control unit 32c can refer to the correspondence relationship V. The display control unit 32c specifies the directions of the α, β axes of the display D at present in the robot coordinate system based on the attitude of TCP and the correspondence relationship V at present. That is, the display control unit 32c may extract a component in the α-axis direction and a component in the β-axis direction of the display D at present from a vector in an arbitrary direction in the robot coordinate system. Note that an axis orthogonal to the αβ plane is referred to as "γ axis".

The display control unit 32c extracts the component in the α axis direction and the component in the β-axis direction of the display D at present from the translational vector and the translational force vector in the robot coordinate system. Then, the display control unit 32c generates display image data representing arrows within the αβ plane formed by the extracted component in the α-axis direction and component in the β-axis direction as display image data that respectively indicate the translational direction and the translational force direction.

Further, the display control unit 32c extracts the component in the-α axis direction and the component in the β-axis direction of the display D at present from the rotational vector and the torque vector in the robot coordinate system. Then, the display control unit 32c generates display image data representing arrows about rotation axes within the αβ plane formed by the extracted component in the α-axis direction and component in the β-axis direction as display image data that respectively indicate the rotational direction and the rotational force direction.

According to the above described configuration, the parameters on the movement state of the force sensor FS can be displayed on the display D. Note that the display control unit 32c may calculate a parameter on a movement state of a display object, but does not necessarily calculate all parameters.

Figure 17:
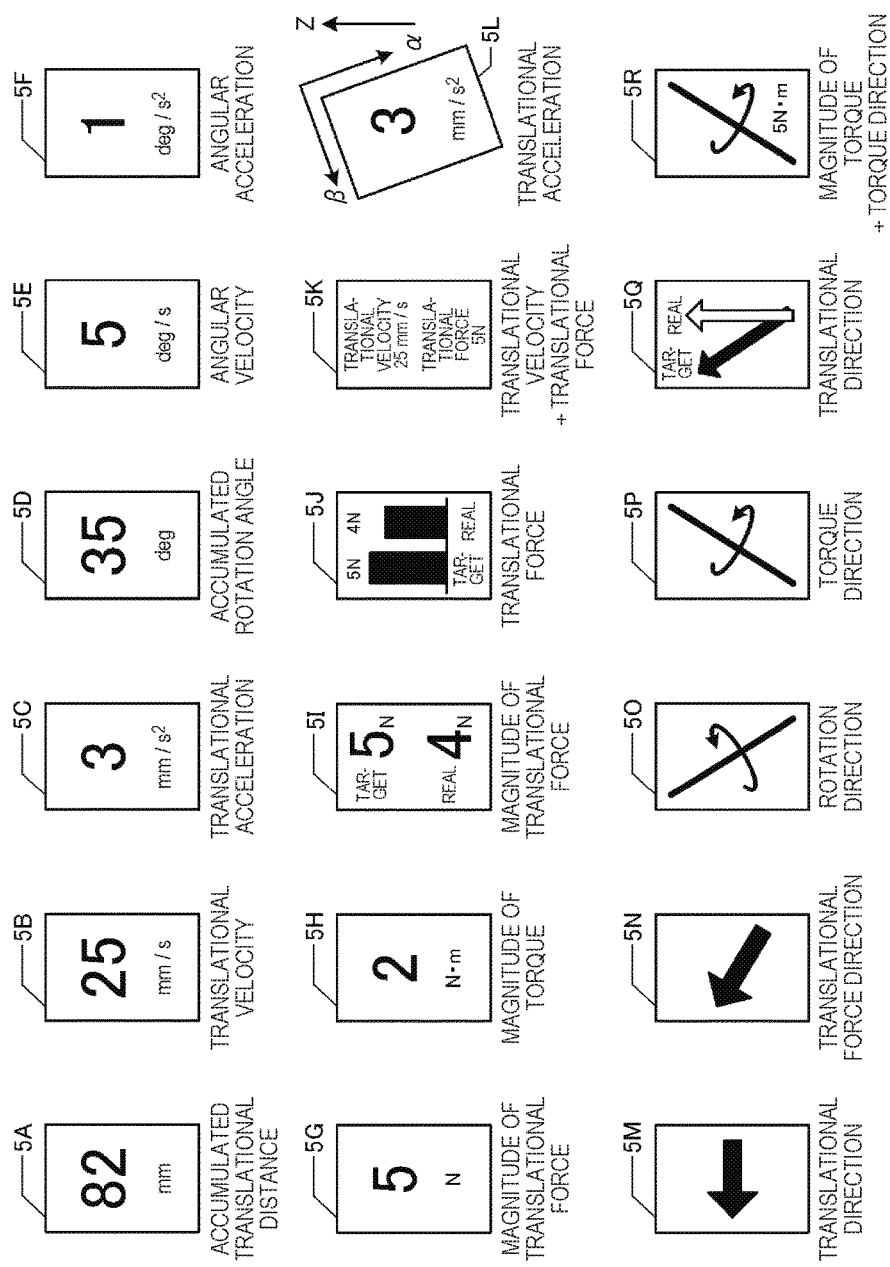
FIG. 17 shows examples of images of the display.

FIG. 17 shows examples of images displayed in the display D. The images 5A to 5L show images representing the parameters on the movement state by numerical values. As shown by the images 5A to 5H, the display control unit 32c may allow the display D to display the numerical values of the parameters on the single movement state.

As shown by the images 5I, 5J, the display control unit 32c may comparably display target and real parameters. Further, as shown by the image 5J, the display control unit 32c may show the numerical values of the parameters on the movement state in a graph or comparably display target and real parameters in a graph. Furthermore, the display control unit 32c may display a value of a difference or a ratio between target and real parameters. Obviously, as shown by the image 5K, the display control unit 32c may display different kinds of parameters together. In addition, as shown by the images 5I to 5K, the display control unit 32c may display names of parameters on the movement state on the display D.

Further, as shown by the image 5L, the display control unit 32c may generate display image data so that the upside of a character is constantly upward in the Z-axis direction regardless of the attitude of the display D. That is, the display control unit 32c may specify the directions of the α, β axes of the display D at present in the robot coordinate system based on the attitude of TCP at present and the correspondence relationship V, and rotate an image based on the directions of the α, β axes. Note that the display control unit 32c may display a unit of the parameter on the movement state and the display of the unit may be omitted. Further, the unit shown in the drawing is just an example, and a parameter on the movement state may be shown by another unit or the unit can be changed. The display control unit 32c may change the magnitude, font, color, background, blinking of characters showing a parameter in response to the kind of parameter on the movement state. Obviously, the display control unit 32c may time-divisionally and sequentially display parameters on a plurality of movement states.

The images 5M to 5Q show images representing directions of parameters on the movement state. As shown by the images 5M to 5Q, the display control unit 32c may display the arrow images indicating the directions of parameters on the movement state on the display D. As shown by the images 5O, 5P, the display control unit 32c may generate display image data representing arrows rotating about the rotation axes formed by the α, β-axis components extracted from the rotational vector and the torque vector as arrows indicating the directions of the rotational vector and the torque vector.

The display control unit 32c may display images of arrows indicating directions of parameters on a plurality of movement states on the display D, and, as shown by the image 5Q, may comparably show the arrows indicating directions of target and real parameters. Further, as shown by the image 5R, the display control unit 32c may display characters showing the magnitude of a parameter with an arrow indicating the direction of the parameter.

In the embodiment, the display D for displaying parameters on the movement state of the manipulator MP (hand part H) is provided in the manipulator MP. Thereby, the display D may be visually recognized while the manipulator MP itself is visually recognized, and the display D displaying the movement state of the manipulator MP may be intuitively recognized. Further, when the acting force $f_S$ acting on the manipulator MP is controlled to be closer to the target force $f_{St}$, the movement state of the manipulator MP becomes complex and harder to be predicted, however, the movement state of the manipulator MP may be easily recognized by visual recognition of the display D.

In the case of the force control, forces are allowed to positively act on the manipulator MP and the work W, and it is highly necessary to carefully watch the state of the manipulator MP to prevent breakage of the manipulator MP, the work W, etc. Further, the acting force $f_S$ changes in response to the minute motion of the manipulator MP, and thereby, in the case of the force control, the movement state of the manipulator MP may change little by little. Particularly, in the case where the impedance control is performed as the force control, the movement state of the manipulator MP becomes a vibrating state and easily changes little by little. In the embodiment, the parameter on the movement state of the manipulator MP may be recognized with careful watch on the state of the manipulator MP, and thus, the parameter on the movement state of the manipulator MP may be easily recognized.

Particularly, when a programmer, a mechanical designer, or a teaching worker sets the motion of the manipulator MP in the control apparatus 3c, the manipulator MP performs an unknown motion, and there is a significant advantage of visual recognition of the parameter on the movement state in the display D.

Further, after the motion of the manipulator MP is set, when an operator or an equipment maintenance engineer determines whether or not the manipulator MP normally operates, there is a significant advantage of recognition of the parameter on the movement state with careful watch on the state of the manipulator MP. Particularly, in case of an abnormality, there is a significant advantage in safety because the state of the manipulator MP may be carefully watched.

Fourth Embodiment

Figure 18:
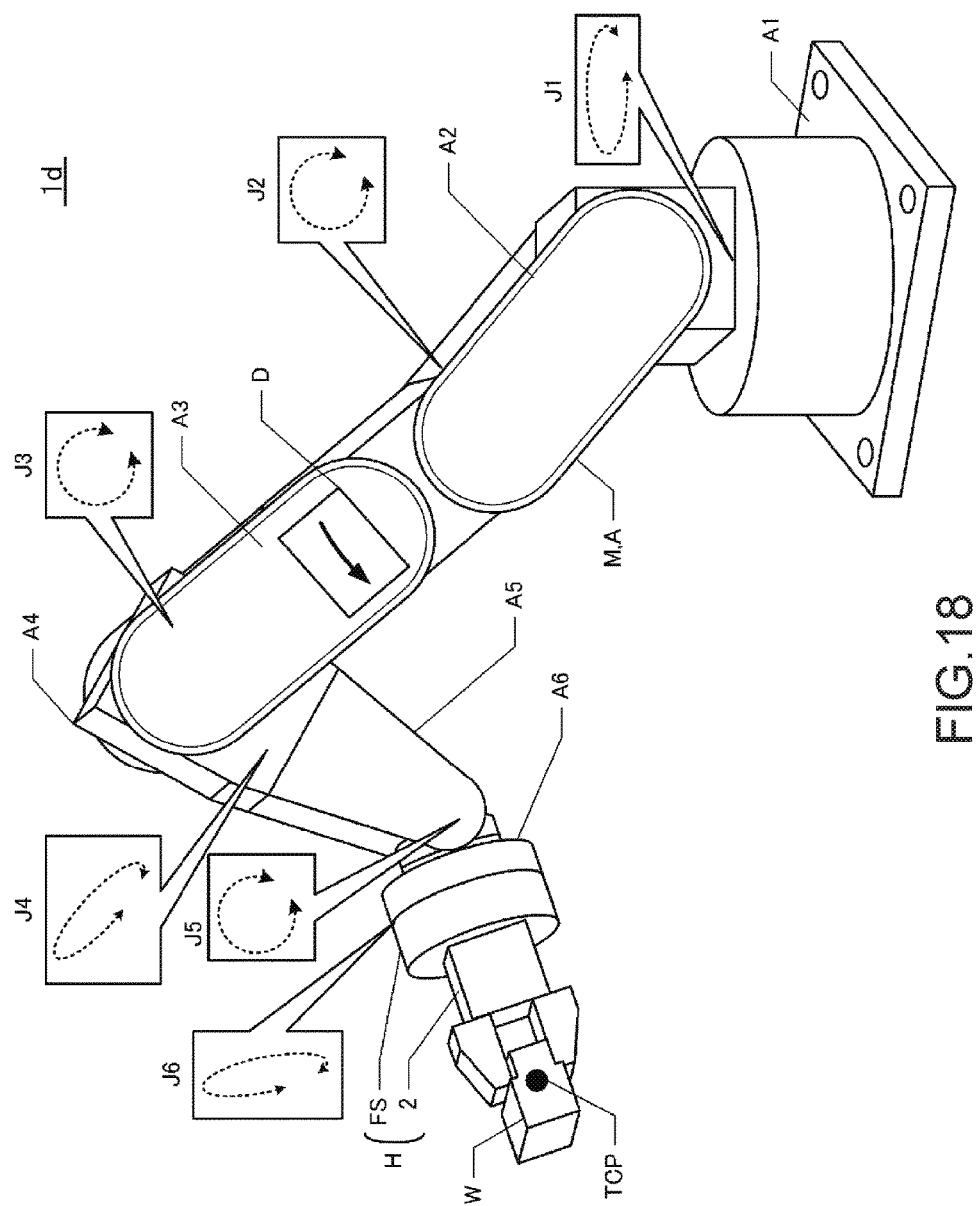
FIG. 18 is a perspective view of a robot of the fourth embodiment.

FIG. 18 is a perspective view of a robot 1d according to the fourth embodiment. The robot 1d according to the fourth embodiment is different from the robot 1c of the third embodiment in the attachment position of the display D and, as shown in FIG. 18, a display D of the robot 1d is attached to an arm member A3. A display control unit 32c (not shown) allows the display D to display a target or real rotation direction of a joint J2 at the proximal end side for directly coupling the arm member A3 with the display D attached thereto. A real rotation direction of the joint J2 may be specified based on an output signal of an encoder E2, and a target rotation direction of the joint J2 may be derived from a target position $S_t$ of target TCP. The display control unit 32c may display a magnitude and a direction of torque derived from load of a motor M2 on the display D. Note that, in order to represent the state of the joint J2, it is desirable to attach the display D onto a flat surface orthogonal to the rotation axis of the joint J2.

It may be possible for a programmer, a mechanical designer, or a teaching worker to predict a movement state of a hand part H, but impossible to predict movement states of the arm members A2 to A6. This is because the positions of the arm members A2 to A6 are not uniquely determined with respect to the position of TCP. As the number of drive axes of the arm A is larger, the prediction of the movement states of the respective arm members A2 to A6 is harder. Even in this case, the displays D are attached to the arm members A2 to A6, and thereby, the parameters on the movement states of the arm members A2 to A6 may be easily recognized.

Further, the number of displays D is not limited to one, but two or more displays D may be attached to the respective arm members A2 to A6. Furthermore, a plurality of displays D may be attached to one of the force sensor FS and the arm members A2 to A6. The movement state used for the control by the drive control unit 31c and the movement state displayed on the display D are not necessarily the same. For example, in the case where the drive control unit 31c performs only position control, the display D may display a real translational force or a magnitude of torque.

Fifth Embodiment

Figure 19A:
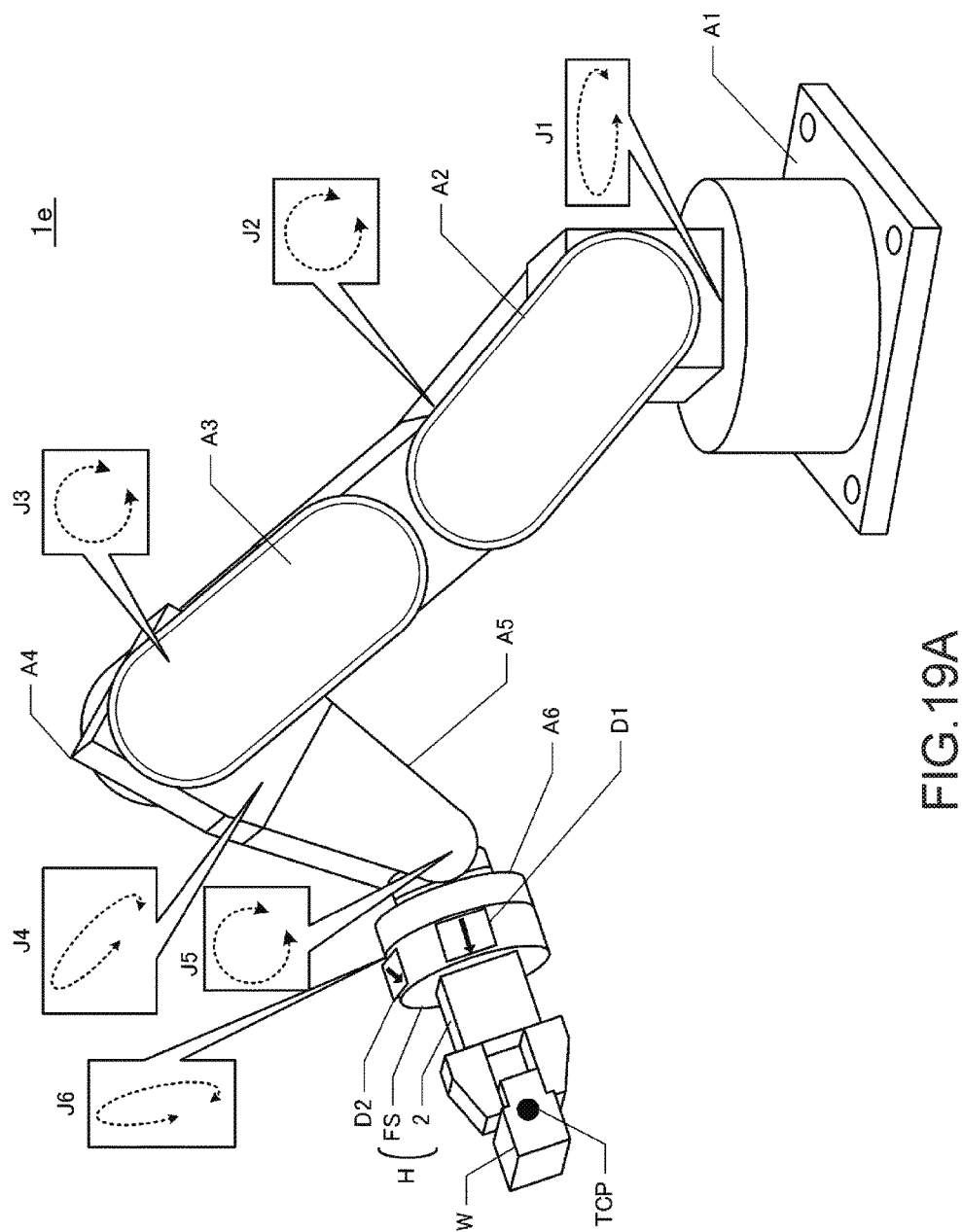
FIG. 19A is a perspective view of a robot of the fifth embodiment.

FIG. 19A is a perspective view of a robot 1e according to the fifth embodiment. The robot 1e according to the fifth embodiment is different from the robot 1c of the third embodiment in the number of attached displays D. As shown in FIG. 19A, two displays D1, D2 are attached to a force sensor FS. The two displays D1, D2 have flat surfaces orthogonal to each other.

Figure 19B:
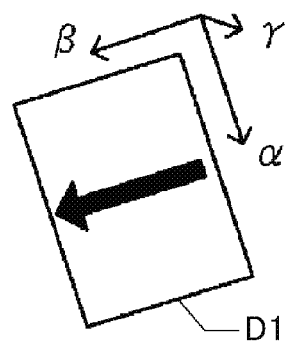
FIG. 19B is a schematic diagram of a display.
Figure 19C:
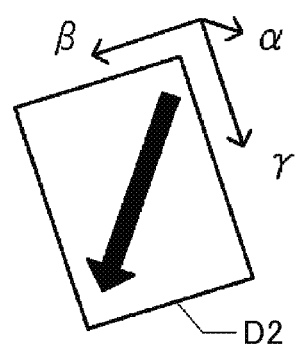
FIG. 19C is a schematic diagram of a display.

As shown in FIG. 19B, the display D1 is the same as the display D of the above described embodiments, and displays an arrow indicating a direction of a parameter on a movement state of a hand part H on an αβ plane. On the other hand, as shown in FIG. 19C, the display D2 displays an arrow indicating a direction of the parameter on the movement state of the hand part H on a βγ plane. A γ axis is an axis orthogonal to the αβ plane.

The display control unit 32c extracts a component in the β-axis direction and a component in the γ-axis direction of the display D2 at present from a translational vector and a translational force vector in the robot coordinate system. Then, the display control unit 32c generates display image data representing arrows within the βγ plane formed by the extracted component in the β-axis direction and component in the γ-axis direction as display image data that respectively indicate a translational direction and a translational force direction.

As described above, the two displays D1, D2 are provided in the robot 1e, and thereby, a three-dimensional direction of the parameter on the movement state of the hand part H may be expressed.

Other Embodiments

The technical scope of the invention is not limited to the above described embodiments, but changes may be made without departing from the scope of the invention.

In the above described first embodiment, the example in which the control unit 32a of the control apparatus 3a derives the force-derived correction amount ΔS and the display control unit 41 of the teaching terminal 4a derives the motion position based on the force-derived correction amount ΔS and the target position $S_t$ is explained, however, the teaching terminal 4a may derive the force-derived correction amount ΔS based on the acting force $f_S$ and the target force $f_{St}$, or the teaching terminal 4a may acquire the motion position from the control unit 32a of the control apparatus 3a instead of deriving the motion position.

Further, in the above described first embodiment, the trajectory display of the motion position including the force-derived correction amount ΔS and the target position is shown, however, the target position and the position indicated by the detection value of the encoder may be shown. Furthermore, the invention is not limited to a mode of displaying the target position and the motion position on the teaching terminal 4a at teaching of the robot 1a, but may be applied to a mode of displaying the target position and the motion position on a screen of a teaching terminal, a teaching pendant, or a control apparatus when the robot operates after teaching.

Furthermore, in the above described first embodiment, two components of each of the target position and the motion position are displayed in the two-dimensional coordinate system, however, one component of each of the target position and the motion position may be displayed as a time function. For example, the above described X components of the target position and the motion position may be displayed as time functions like the X monitor 131. Further, the XYZ components of the target position and the XYZ components of the motion position may be displayed in three-dimensional computer graphics.

In the above described second embodiment, ON of the force control mode may be specified by the argument of the command, however, ON of the force control mode may be specified by the main body of the command. Specifically, a program language in which the command main body itself is divided into a part that turns ON the force control mode and a part that turns OFF the force control mode may be mounted on the robot system.

Further, the time from resetting of the force sensor by the force control-associated command to operation of the arm by the force control may be controlled using a timer. That is, setting of the timer may be incorporated into the execution sequence of the force control-associated command.

Furthermore, in the above described second embodiment, the impedance control is taken as an example of controlling the motion of the manipulator based on the output of the force detector, however, the motion of the manipulator may be controlled, not using the equation of motion, but using a control amount linear with respect to the output of the force controller.

In the third embodiment, the example in which the numerical values of the parameters on the plurality of movement states are singly displayed is explained, however, the display control unit 32c may switch the parameter on the movement state to be displayed between the case where both the force control and the position control are performed and the case where only the position control is performed. For example, the display control unit 32c may display the parameters of the force condition including the translational force direction, the magnitude of the translational force, the torque direction, and the magnitude of torque only in the case where both the force control and the position control are performed.

Obviously, the display control unit 32c may display parameters of the moving state including the translational velocity, the translational acceleration, the rotation direction, the accumulated rotation angle, the rotation velocity, the angular velocity, the angular acceleration, and the translational force direction in the case where both the force control and the position control are performed. In the case where both the force control and the position control are performed, the moving state of the manipulator MP easily changes little by little, and accordingly, the display update cycle of the parameter of the movement state may be made smaller or the number of displayed digits of the numerical value may be made larger than those in the case where only the position control is performed.

Further, the display control unit 32c may accumulate the accumulated translational distance and the accumulated rotation angle and the start time of the force control may be used as an accumulation start time of the accumulated translational distance and the accumulated rotation angle in the case where both the force control and the position control are performed. Thereby, the degree of extension of the trajectory of the manipulator MP by the force control may be easily understood.

In the above described embodiments, the example of applying the invention to the control apparatus of the six-axis single-arm robot is explained, however, the robot according to the invention is not necessarily the six-axis single-arm robot and the number of joints of the manipulator is not particularly limited. The robot according to the invention may be applied to a robot of five or less axes or seven or more axes, a dual-arm robot, or a scalar robot.

The force sensor FS is not necessarily a force sensor of multiple axes or may be a torque sensor that detects torque acting on the joints J1 to J6 with respect to each of the joints J1 to J6. Or, in place of the torque sensor, the torque may be detected based on load of the motors M1 to M6.

The control apparatus is not limited to an apparatus independent of the robot, but may be built in the robot. In this case, the display control unit may be provided in the robot. Or, the display control unit may be provided in another apparatus than the robot or the control apparatus.

The display D may be provided in the manipulator, and attached to the movable arm members A2 to A6 or attached to the end effector 2. When the displays D are attached to the arm members A2 to A6, the display control unit may allow the displays D to display the parameters on the movement states of the arm members A2 to A6 with the displays D attached thereto.

The display control unit may acquire the parameters on the real movement states of the arm members A2 to A6 with the displays D attached thereto based on the drive positions of the motors M2 to M6 of the joints J2 to J6 closer to the proximal end side (the arm member A1 side) than the arm members A2 to A6. Further, the drive positions that should be taken by the motors M2 to M6 are determined with respect to each target position $S_t$ of TCP, and accordingly, the display control unit may acquire the parameters on the target movement states of the arm members A2 to A6 with the displays D attached thereto based on the target position $S_t$ of TCP.

Specifically, the display control unit may allow the displays D to display the rotation directions and the torque of the joints J2 to J6 on the proximal end side for directly coupling the arm members A2 to A6 with the displays D attached thereto as the parameters on the movement states of the arm members A2 to A6 with the displays D attached thereto.

The entire disclosure of Japanese Patent Application Nos. 2015-112890, filed Jun. 3, 2015, 2015-149344, filed Jul. 29, 2015 and 2015-150428, filed Jul. 30, 2015 are expressly incorporated by reference herein.

What is claimed is:

1. A robot control apparatus that controls a robot including a manipulator having a plurality of arm members attached by a plurality of joints that rotate completely about respective rotation axes and to which one of a plurality of end effectors may be attached, a force detector provided in the manipulator, and an actuator that drives the manipulator based on a target position, the robot control apparatus comprising:
a display controller configured to display a current motion position of the manipulator and the target position on a screen; and
a robot controller configured to control the robot,
wherein the robot controller is configured to derive the current motion position of the manipulator based on a target force and an output of the force detector, to determine a velocity of the current motion position, and to determine an acting force coordinate from the output of the force detector, and
the display controller is configured to display a speedometer indicating the velocity of the current motion position on the screen and to display a monitor in which the acting force coordinate is displayed as a time function in a line graph.

2. The robot control apparatus according to claim 1, wherein the display controller displays the target position and the current motion position on the same coordinate plane.

3. The robot control apparatus according to claim 2, wherein the display controller displays a trajectory formed by projection of the target position in three dimensions and the current motion position in three dimensions on a two-dimensional coordinate plane.

4. The robot control apparatus according to claim 1, wherein the display controller displays the target position and the current motion position as time functions.

5. The robot control apparatus according to claim 1, wherein the display controller acquires a specified time range and is configured to display the target position and the current motion position during the specified time range.

6. The robot control apparatus according to claim 1, wherein the display controller displays directions of change of the target position and the current motion position.

7. The robot control apparatus according to claim 1, wherein the display controller displays the target position and the current motion position in real time.

8. The robot control apparatus according to claim 1, further comprising a user-operated computer that receives a teaching of a teacher based on the displayed target position and the current motion position.

9. A robot system comprising:
a robot including a manipulator, a force detector provided in the manipulator, and an actuator that drives the manipulator based on a target position; and
the robot control apparatus according to claim 1.

* * * * *